US012728749B2

(12) United States Patent
Kato et al.

(10) Patent No.: US 12,728,749 B2
(45) Date of Patent: Sep. 8, 2026

(54) AUTONOMOUS TRAVELING DEVICE, AUTONOMOUS TRAVELING MANAGEMENT SYSTEM, AUTONOMOUS TRAVELING MANAGEMENT METHOD

(71) Applicant: DENSO CORPORATION, Kariya-city (JP)

(72) Inventors: Yuki Kato, Kariya-city (JP); Hiroyuki Ohsawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 56 days.

(21) Appl. No.: 19/001,791

(22) Filed: Dec. 26, 2024

(65) Prior Publication Data

US 2025/0121723 A1 Apr. 17, 2025

Related U.S. Application Data

(63) Continuation of application No. PCT/JP2023/021315, filed on Jun. 8, 2023.

(30) Foreign Application Priority Data

Jun. 29, 2022 (JP) ................................ 2022-105083

(51) Int. Cl.
*B60L 53/60* (2019.01)
*B60L 53/80* (2019.01)
*B65G 1/04* (2006.01)

(52) U.S. Cl.
CPC ............... *B60L 53/60* (2019.02); *B60L 53/80* (2019.02); *B65G 1/04* (2013.01)

(58) Field of Classification Search
CPC .......... B60L 53/60; B60L 53/80; B60L 50/60; B60L 2260/32; B60L 50/64; B60L 53/35; B65G 1/04; B60K 1/04; Y02T 10/70; G05D 1/43; H01M 10/42; H01M 50/244; H02J 7/00; H02J 50/05
See application file for complete search history.

(56) References Cited

U.S. PATENT DOCUMENTS

| | | | | |
|---|---|---|---|---|
| 2011/0106294 A1* | 5/2011 | Bebbington | ............ | B60L 53/80 700/218 |
| 2019/0375306 A1* | 12/2019 | Ambrosetti | ............. | B60L 53/30 |
| 2020/0078936 A1* | 3/2020 | Wu | ...................... | B65G 1/0492 |

FOREIGN PATENT DOCUMENTS

| | | |
|---|---|---|
| JP | 4687684 B | 5/2011 |
| JP | 6637334 B | 1/2020 |

* cited by examiner

*Primary Examiner* — Aniss Chad
*Assistant Examiner* — Christine Nguyen Huynh
(74) *Attorney, Agent, or Firm* — Precision Patents, P.C.

(57) ABSTRACT

An autonomous traveling device autonomously travels in a charged state after being charged at a charging station of an autonomous traveling management system, and includes: a traveling unit that receives power; a battery unit capable of supplying the power to the traveling unit in the charged state and in a coupled state where the battery unit is coupled to the traveling unit; a detachable structure that is a structure for detachably connecting the battery unit to the traveling unit, forms a fitting gap through which a guide rail that guides the battery unit; and a power supply structure for contactlessly supplying the power.

14 Claims, 25 Drawing Sheets

145B
145A
145
141B
141A
141
141
141
54
RTU
BU
u
Y, f
X
X
l
Y, r

145/146
141/142
5190
5190A
5190B
141/142
54
RTU
BU
Y
X
u
l
X
Y

145/146
6192B
6192A
6192
141/142
141/142
54
RTU
BU
X
Y
u
l

AUTONOMOUS TRAVELING DEVICE, AUTONOMOUS TRAVELING MANAGEMENT SYSTEM, AUTONOMOUS TRAVELING MANAGEMENT METHOD

CROSS REFERENCE TO RELATED APPLICATIONS

The present application is a continuation application of International Patent Application No. PCT/JP2023/021315 filed on Jun. 8, 2023, which designated the U.S. and claims the benefit of priority from Japanese Patent Application No. 2022-105083 filed on Jun. 29, 2022. The entire disclosures of all of the above applications are incorporated herein by reference.

TECHNICAL FIELD

The present disclosure relates to an autonomous traveling technology that enables autonomous traveling while in a charged state.

BACKGROUND

In an autonomous traveling device of a comparative example, a battery unit that provides power is detachably coupled to a traveling unit that receives power for autonomous traveling.

SUMMARY

An autonomous traveling device autonomously travels in a charged state after being charged at a charging station of an autonomous traveling management system, and includes: a traveling unit that receives power; a battery unit capable of supplying the power to the traveling unit in the charged state and in a coupled state where the battery unit is coupled to the traveling unit; a detachable structure that is a structure for detachably connecting the battery unit to the traveling unit, forms a fitting gap through which a guide rail that guides the battery unit; and a power supply structure for contactlessly supplying the power.

BRIEF DESCRIPTION OF THE DRAWINGS

FIG. 4 is a block diagram showing a control unit of an autonomous traveling device according to the first embodiment.

FIG. 6 is a side view showing the autonomous traveling device according to the first embodiment.

FIG. 7 is a perspective view showing the autonomous traveling device according to the first embodiment.

FIG. 8 is a perspective view showing the autonomous traveling device according to the first embodiment.

FIG. 11 is a perspective view showing the autonomous traveling management system and the autonomous traveling device according to the first embodiment.

FIG. 24 is a perspective view showing the autonomous traveling management system and the autonomous traveling device according to a fifth embodiment.

FIG. 25 is a perspective view showing the autonomous traveling management system and the autonomous traveling device according to the fifth embodiment.

FIG. 26 is a perspective view showing the autonomous traveling management system and the autonomous traveling device according to a modification of the fifth embodiment.

FIG. 29 is a perspective view showing the autonomous traveling management system and the autonomous traveling device according to a modification of the sixth embodiment.

DETAILED DESCRIPTION

Figure 1:
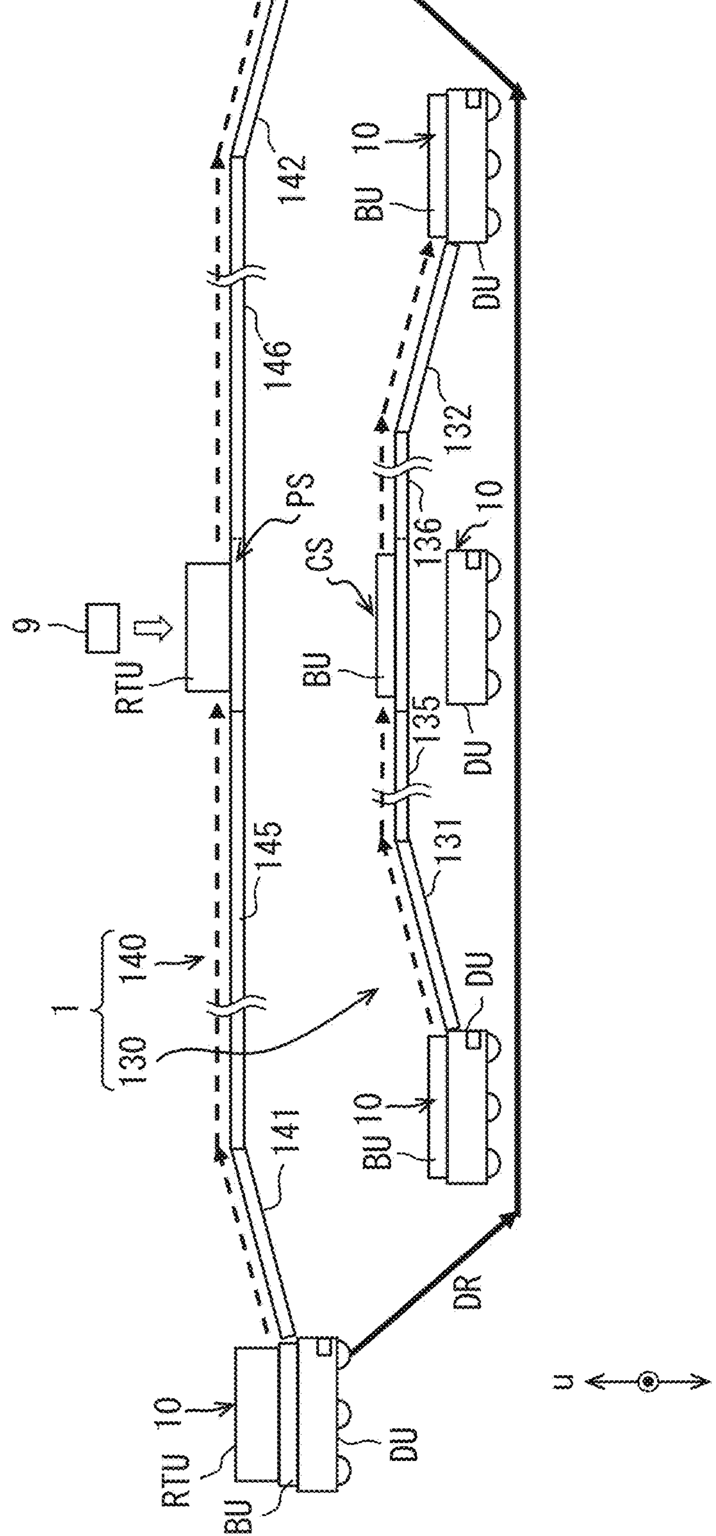
FIG. 1 is a configuration diagram showing an autonomous traveling management system according to a first embodiment.

However, in the autonomous traveling device of the comparative example, the detachable battery unit is coupled to the traveling unit with bolts. Therefore, in an autonomous traveling device for transporting package, for example, it has been difficult to replace a discharged battery unit in a timely manner in a short period and to make the replacement efficient.

One example of the present disclosure provides an autonomous traveling device that makes battery unit replacement more efficient. Another example of the present disclosure provides an autonomous traveling management system that makes battery unit replacement more efficient. Further, another example of the present disclosure provides an autonomous traveling management method that makes battery unit replacement more efficient.

According to a first example embodiment, an autonomous traveling device autonomously travels in a charged state after being charged at a charging station of an autonomous traveling management system, and the autonomous traveling device includes: a traveling unit that receives power for autonomous traveling; a battery unit capable of supplying the power to the traveling unit in the charged state and in a coupled state where the battery unit is coupled to the traveling unit; a detachable structure that is a structure for detachably connecting the battery unit to the traveling unit by convex-concave fitting, forms, at a coupling area, a fitting gap through which a guide rail that guides the battery unit between the traveling unit and the charging station in the autonomous traveling management system moves forward and backward; and a power supply structure for contactlessly supplying the power from the battery unit to the traveling unit through the fitting gap.

According to a first example embodiment, in the detachable structure, a power supply structure is provided to contactlessly supply power from the battery unit to the traveling unit through the first fitting gap formed in the coupling area at the first coupling portion. The first coupling portion detachably connects the battery unit BU to the traveling unit by the convex-concave fitting. Therefore, according to the first example embodiment, the first guide rail that guides the battery unit between the traveling unit and the charging station in the autonomous traveling management system is able to move forward and backward in the fitting gap. According to this, the autonomous traveling management system receives the battery unit guided by the guide rail from the traveling unit to which power is supplied. On the other hand, the battery unit charged at the charging station can be transferred to the traveling unit by the guide rail. Therefore, the discharged battery unit can be replaced with a charged battery unit in a timely manner in a short period. It is possible to improve the efficiency of the replacement.

According to a second example embodiment of the present disclosure, an autonomous traveling management system for managing charging at a charging station for the autonomous traveling device according to the first example embodiment, the system includes a processor configured to: in a reception phase of receiving the battery unit from the traveling unit, manage forward-backward movement of the guide rail relative to the fitting gap; in a charging phase of charging the battery unit received from the traveling unit, manage the charging; and in a delivery phase of delivering the charged battery unit to the traveling unit, manage the forward-backward movement of the guide rail with respect to the fitting gap.

According to a third example embodiment of the present disclosure, an autonomous traveling management method is executed by a processor for managing charging at a charging station for the autonomous traveling device according to the first example embodiment, and the method includes: in a reception phase of receiving the battery unit from the traveling unit, managing forward-backward movement of the guide rail relative to the fitting gap; in a charging phase of charging the battery unit received from the traveling unit, managing the charging; and in a delivery phase of delivering the charged battery unit to the traveling unit, managing the forward-backward movement of the guide rail with respect to the fitting gap.

According to the second and third example embodiment described above, the autonomous traveling management system receives the battery unit guided by the guide rail above the traveling unit in the reception phase. On the other hand, the battery unit charged in the charging phase can be transferred onto the traveling unit by the guide rail in the delivery phase. Therefore, the battery unit that has been discharged by supplying power to the traveling unit can be replaced in a timely manner in a short period with the battery unit that has been charged at the charging station. It is possible to improve the efficiency of the replacement.

According to a fourth example embodiment of the present disclosure, in the first example embodiment, the autonomous traveling device further includes a storage transport unit that transports a package in a storage state where the package is stored at a picking station of the autonomous traveling management system and in a coupled state where the package is coupled onto the battery unit. The detachable structure includes: a first coupling portion that is a coupling portion that detachably couples the battery unit to the traveling unit by the convex-concave fitting, and forms, at the coupling area, a first fitting gap that is the fitting gap through which a first guide rail as the guide rail moves forward and backward; and a second coupling portion that is a coupling portion that detachably couples the storage transport unit to the battery unit coupled to the traveling unit by the convex-concave fitting, and forms, at the coupling area, a second fitting gap that is the fitting gap through which a second guide rail that guides the storage transport unit between the battery unit and the picking station in the autonomous traveling unit management system moves forward and backward.

In this way, in the detachable structure of the fourth example embodiment, at the first coupling portion where the battery unit is detachably coupled to the traveling unit by the convex-concave fitting, non-contact power supply from the battery unit to the traveling unit is implemented by the power supply structure via the first fitting gap formed at the coupling point. Therefore, according to the fourth example embodiment, the first guide rail that guides the battery unit between the traveling unit and the charging station in the autonomous traveling management system is able to move forward and backward in the first fitting gap. According to this, the autonomous traveling management system receives the battery unit guided by the receiving side first guide rail from the traveling unit as the power supply destination, while transferring the battery unit charged at the charging station onto the traveling unit by the delivering side first guide rail. Therefore, the discharged battery unit can be replaced with a charged battery unit in a timely manner in a short period. It is possible to improve the efficiency of the replacement.

Further, in the detachable structure according to the fourth example embodiment, a second fitting gap is formed at the second coupling portion where the storage transport unit is detachably coupled to the battery unit connected to the traveling unit by the concave-convex fitting. Therefore, in the second fitting gap according to the fourth example embodiment, a second guide rail that guides the storage transport unit between the battery unit and the picking station side in the autonomous traveling management system is able to move forward and backward. According to this, the autonomous traveling management system receives the storage transport unit guided by the second guide rail from the upper position with respect to the battery unit coupled to the traveling unit. Meanwhile, the storage transport unit that has stored the package at the picking station can be delivered onto the battery unit by the second guide rail. Therefore, after transporting the package, the storage transport unit can be replaced with the storage transport unit in which the package is stored in a timely manner in a short period. It is possible to make the replacement more efficient.

According to a fifth example embodiment of the present disclosure, an autonomous traveling management system manages: charging at a charging station for the autonomous traveling device according to the fourth example embodiment; and storing a package at a picking station, and the system includes a processor configured to: in a first reception phase of receiving the battery unit from the traveling unit, manage forward-backward movement of the first guide rail with respect to the first fitting gap; in a charging phase of charging the battery unit received from the traveling unit, manage the charging; in a first delivery phase of delivering the charged battery unit to the traveling unit, manage the forward-backward movement of the first guide rail with respect to the first fitting gap; in a second reception phase of receiving the storage transport unit from the battery unit on the traveling unit, manage the forward-backward movement of the second guide rail with respect to the second fitting gap; in a storage phase of storing the package in the storage transport unit received from the traveling unit, manage storage; and in a second delivery phase of delivering the storage transport unit in which the package is stored to the battery unit on the traveling unit, manage the forward-backward movement of the second guide rail with respect to the fitting gap.

According to a sixth example embodiment of the present disclosure, an autonomous traveling management method is executed by a processor for managing: charging at a charging station for the autonomous traveling device according to fourth example embodiment; and storing a package at a picking station, and the method includes: in a first reception phase of receiving the battery unit from the traveling unit, managing forward-backward movement of the first guide rail with respect to the first fitting gap; in a charging phase of charging the battery unit received from the traveling unit, managing the charging; in a first delivery phase of delivering the charged battery unit to the traveling unit, managing the forward-backward movement of the first guide rail with respect to the first fitting gap; in a second reception phase of receiving the storage transport unit from the battery unit on the traveling unit, managing the forward-backward movement of the second guide rail with respect to the second fitting gap; in a storage phase of storing the package in the storage transport unit received from the traveling unit, managing storage; and in a second delivery phase of delivering the storage transport unit in which the package is stored to the battery unit on the traveling unit, managing the forward-backward movement of the second guide rail with respect to the fitting gap.

The autonomous traveling management system according to the fifth and sixth example embodiments receives the battery unit guided by the first guide rail from above the traveling unit in the first reception phase, while transferring the battery unit charged in the charging phase onto the traveling unit by the first guide rail in the first delivery phase. Therefore, the battery unit that has been discharged by supplying power to the traveling unit can be replaced in a timely manner in a short period with the battery unit that has been charged at the charging station. It is possible to improve the efficiency of the replacement.

Furthermore, the autonomous traveling management system according to the fifth and sixth example embodiments receives the battery unit guided by the guide rail from the battery unit coupled to the traveling unit in the second reception phase. On the other hand, the storage transport unit that has stored the package in the storage phase can be delivered onto the battery unit by the second guide rail in the second delivery phase. Therefore, after transporting the package, the storage transport unit can be replaced in a timely manner in a short period at the picking station with the storage transport unit in which the package is stored. Therefore, it is possible to improve the replacement efficiency.

The following will describe embodiments of the present disclosure with reference to the drawings. It should be noted that the same reference numerals are assigned to corresponding components in the respective embodiments, and overlapping descriptions may be omitted. When only a part of the configuration is described in the respective embodiments, the configuration of the other embodiments described before may be applied to other parts of the configuration. Further, not only the combinations of the configurations explicitly shown in the description of the respective embodiments, but also the configurations of the multiple embodiments can be partially combined together even if the configurations are not explicitly described under a condition that there is no difficulty in the combination in particular.

First Embodiment

An autonomous traveling management system 1 of a first embodiment shown in FIG. 1 manages charging at a charging station CS and storage of a package 9 at a picking station PS for multiple autonomous traveling devices 10. The autonomous traveling device 10 managed by the autonomous traveling management system 1 is a vehicle or robot that can autonomously travel in any direction, forward, backward, left or right, in accordance with the management in a charged state in which it is charged at the charging station CS. The autonomous traveling device 10 may be a delivery vehicle that autonomously travels on a road and transports the package 9 to a delivery destination. The autonomous traveling device 10 may be a logistics vehicle that autonomously travels through a warehouse to transport the package 9. The autonomous traveling device 10 may be a disaster support robot that autonomously travels through disaster areas and transports the package 9 as supplies. The autonomous traveling device 10 may be of a category other than those described above.

Figure 2:
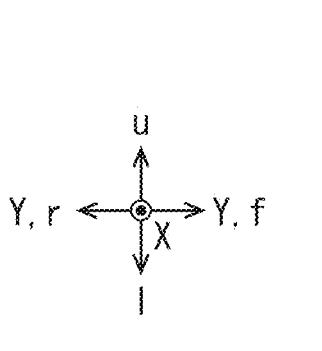
FIG. 2 is a configuration diagram showing an autonomous traveling device according to the first embodiment.
Figure 2:
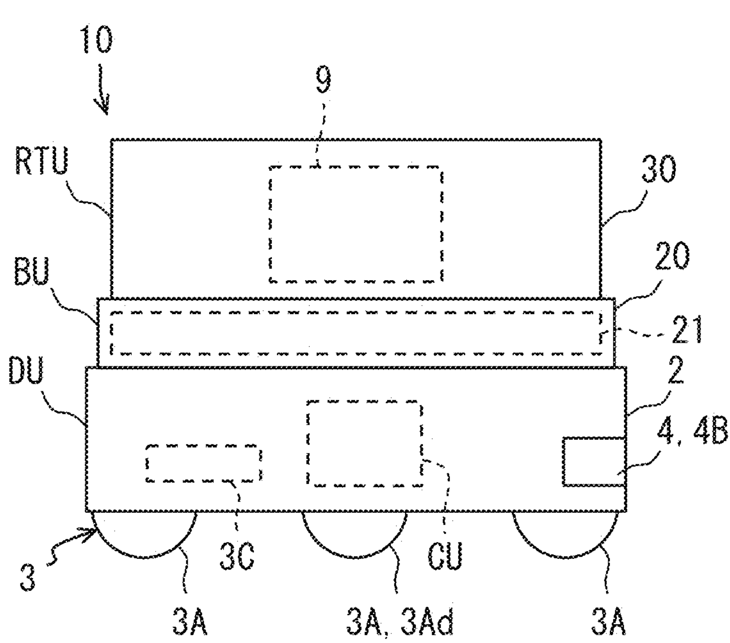
Figure 3:
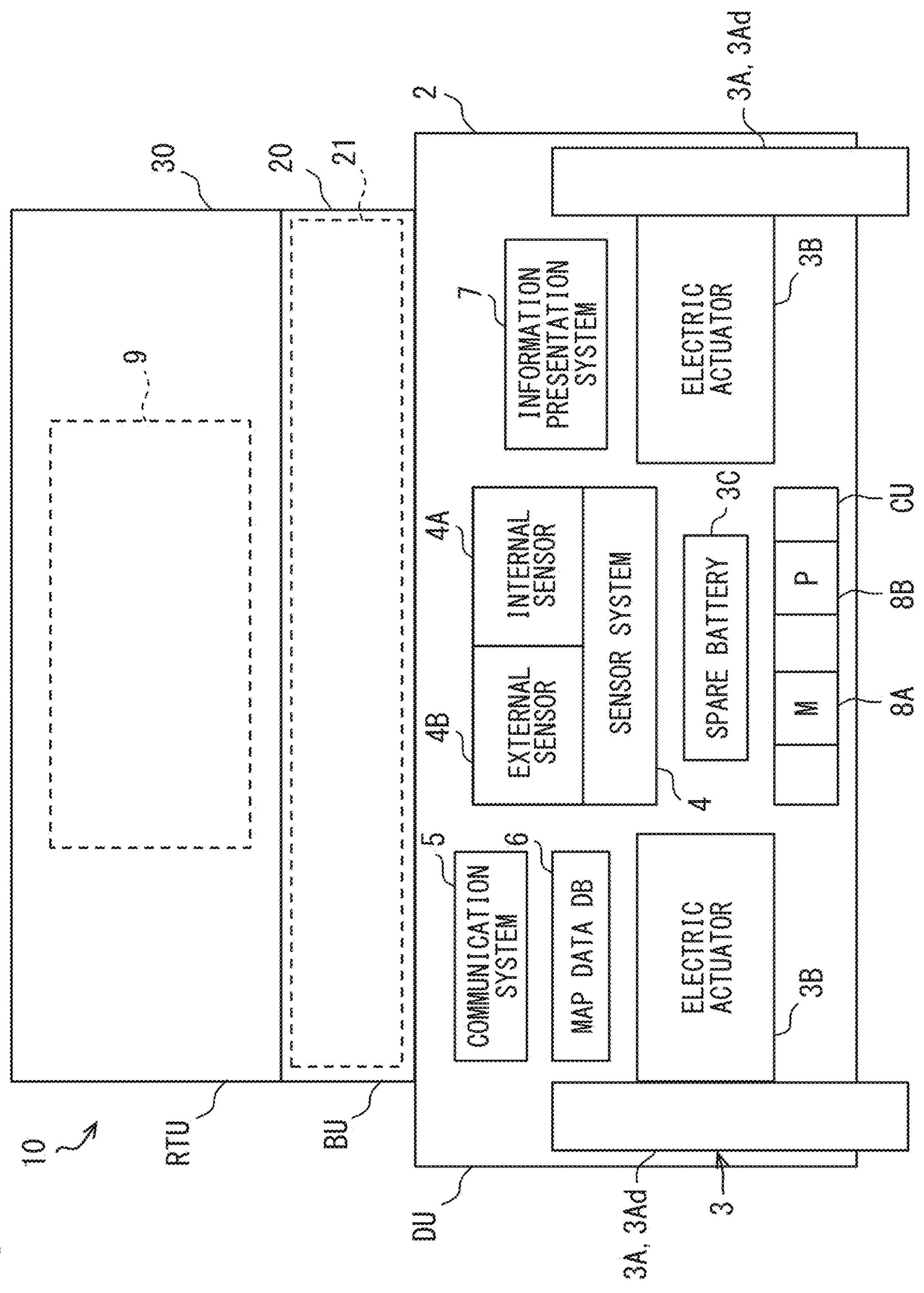
FIG. 3 is a block diagram sowing the autonomous traveling device according to the first embodiment.

As shown in FIGS. 1 to 3, the autonomous traveling device 10 includes a traveling unit DU, a battery unit BU, a storage transport unit RTU, and a control unit CU. In the following description, unless otherwise noted, front (f), rear (r), up (u), down (l), left, and right are defined based on the autonomous traveling device 10 on a horizontal plane and a management center on a horizontal plane where the autonomous traveling management system 1 is installed. The term of "down (l)" may also mean a term of "low". The front direction may be also referred to as a forward direction. The rear direction may be also referred to as a backward direction.

As shown in FIGS. 2 and 3, the traveling unit DU includes a body 2, a drive system 3, a sensor system 4, a communication system 5, a map database 6, and an information presentation system 7. The body 2 has a hollow shape, which is made of metal, for example. The body 2 holds other components of the traveling unit DU inside or across from the inside to the outside. The body 2 also holds therein the control unit CU.

The drive system 3 is provided with wheels 3A and an electric actuator 3B. The multiple wheels 3A are configured to rotate independently of each other. The wheels 3A includes drive wheels 3Ad that are provided respectively to the left portion and the right portion of the body 2, and the drive wheels 3Ad are independently driven by the actuators 3B provided respectively for the drive wheels 3Ad. In the present embodiment, the rotation speed difference (that is, the rotation speed difference per unit time) between the driving wheels 3Ad determines whether the autonomous traveling device 10 drives straight or turns.

Specifically, the autonomous traveling device 10 drives straight when the rotation speed difference between the right and left drive wheels 3Ad is zero or substantially zero. On the other hand, the autonomous traveling device 10 turns when the rotation speed difference between the right and left drive wheels 3Ad increases. The greater the rotation speed difference, the less the turning radius of the autonomous traveling device 10 is. Here, the turning radius means the distance between the vertical center line of the body 2 and the center of the turning in a planar view. The turning is a point turning when the turning radius is substantially zero. As shown in FIG. 2, the multiple wheels 3A may include at least one driven wheel that rotates following the drive wheel 3Ad.

Each of the pair of electric actuators 3B is mainly constituted by an individual electric motor. Each electric actuator 3B independently drives and rotates the corresponding drive wheel 3Ad. Each electric actuator 3B may be equipped with a brake unit that applies braking force to the corresponding drive wheel 3Ad during rotation. Each electric actuator 3B may be provided with a lock unit that locks the corresponding drive wheel 3Ad when the wheel is stopped.

The drive system 3 is further provided with a spare battery 3C. The spare battery 3C mainly includes a storage battery such as a lithium ion battery, for example. The spare battery 3C stores the power supplied from the battery unit BU coupled to the traveling unit DU, with a capacity smaller than that of the battery unit BU, as described later. The spare battery 3C is connected to each electric actuator 3B, the sensor system 4, the communication system 5, the map database 6, the information presentation system 7, and the control unit CU via, for example, a wire harness. Therefore, as described later, when the battery unit BU is detached from the traveling unit DU, the spare battery 3C becomes capable of supplying power to these connected devices in place of the battery unit BU. In other words, when the units BU and DU are in the decoupled state, the electrical components of the traveling unit DU and the control unit CU can receive power for autonomous traveling from the preliminarily charged spare battery 3C.

The sensor system 4 acquires sensing information that can be used for the autonomous traveling of the autonomous traveling device 10 by sensing the internal and external environments of the autonomous traveling device 10. Specifically, the sensor system 4 includes an internal sensor 4A and an external sensor 4B. The internal sensor 4A acquires internal environment information as sensing information from the internal environment of the autonomous traveling device 10. The internal sensor 4A may be a physical quantity detection type of acquiring the internal information by detecting a specific physical quantity of motion inside the autonomous traveling device 10. The internal sensor 4A of the physical quantity detection type is, for example, at least one of a driving speed sensor, an acceleration sensor, a yaw rate sensor, or the like.

The external sensor 4B acquires external environment information as sensing information from the external environment that is the peripheral environment of the autonomous traveling device 10. The external sensor 4B may be of an object detection type, which acquires external information by detecting an object existing in the external environment of the autonomous traveling device 10. The external sensor 4B of the object detection type is at least one of a camera, a Light Detection and Ranging/Laser Imaging Detection and Ranging (LiDAR), a radar, sonar, and the like, for example. The external sensor 4B may be a positioning type sensor that acquires external environment information by receiving a positioning signal from an artificial satellite of a global navigation satellite system (GNSS) present outside the autonomous traveling device 10. The external sensor 4B of a positioning type is, for example, a GNSS receiver or the like.

The communication system 5 transmits and receives communication information related to the autonomous traveling of the autonomous traveling device 10 via wireless communication between the autonomous traveling device 10 and the external environment. The communication system 5 may be a V2X type communication system that exchanges communication information with a Vehicle to Everything (i.e., V2X) system located in the external environment of the autonomous traveling device 10. The communication system 5 of the V2X type may be at least one of a dedicated short range communications (i.e., DSRC) communication device, a cellular V2X (i.e., C-V2X) communication device, or the like, for example. The communication system 5 may be a terminal communication type communication system that exchanges communication information with a mobile terminal existing in the external environment of the autonomous traveling device 10. For example, the communication system 5 having the terminal communication type may be at least one of a Bluetooth (registered trademark) device, a Wi-Fi (registered trademark) device, an infrared communication device, or the like.

The map database 6 acquires map information that can be used for the autonomous traveling of the autonomous traveling device 10 from the autonomous traveling management system 1 via the communication system 5 and stores it. The map database 6 mainly includes at least one non-transitory tangible storage medium capable of storing map information, such as a semiconductor memory, a magnetic medium, and an optical medium, for example. The map information stored in the map database 6 is converted into two-dimensional or three-dimensional data as information indicating the traveling environment of the autonomous traveling device 10. The map information may include road information indicating at least one of road position, road shape, road surface condition, or the like, for example. The map information may include marking information, which indicates at least one of traffic sign attached to a road, lane mark position, or lane mark shape, for example. The map information may include, for example, structure information indicating at least one of positions or shapes of a building and a traffic light along a road.

The information presentation system 7 presents notification information directed to the outside environment of the autonomous traveling device 10 regarding navigation and autonomous traveling of the autonomous traveling device 10. The information presentation system 7 may present notification information by stimulating the vision of a human being in the external environment of the autonomous traveling device 10. The visual stimulation type information presentation system 7 is at least one of a monitor unit or a light emitting unit, for example. The information presentation system 7 may present notification information by stimulating the hearing sense of a human being in the external environment of the autonomous traveling device 10. The auditory stimulation type information presentation system 7 is, for example, at least one of a speaker, a buzzer, a vibration unit, and the like.

The battery unit BU is constructed on the traveling unit DU so as to be mechanically and electrically detachable. The battery unit BU includes a battery case 20 and a battery pack 21. The battery case 20 has a hollow shape, which is made of metal, for example. The battery case 20 holds the battery pack 21 therein.

The battery pack 21 mainly includes a storage battery such as a lithium ion battery, for example. The battery pack 21 stores electric power that can be supplied to electrical components of the autonomous traveling device 10 by discharging the electricity, by charging it from a power supply source of the charging station CS (see FIG. 1) in the autonomous traveling management system 1. The battery pack 21 may store regenerative electric power from the electric actuator 3B when the battery unit BU and the traveling unit DU are coupled together. When the battery unit BU is connected to the traveling unit DU, the battery pack 21 is capable of supplying power to the drive system 3, the sensor system 4, the communication system 5, the map database 6, the information presentation system 7, and the control unit CU. In other words, when the units BU and DU are connected, the electrical components of the traveling unit DU and the control unit CU can receive power for autonomous traveling from the charged battery unit BU.

The storage transport unit RTU is constructed on the battery unit BU so as to be mechanically and electrically detachable. The storage transport unit RTU mainly includes a transport box 30. The transport box 30 is made of, for example, metal or synthetic resin and has a hollow shape. The transport box 30 stores the package 9 to be transported to each autonomous traveling device 10 from among multiple package 9 collected at the picking station PS (see FIG. 1) in the autonomous traveling management system 1. The storage transport unit RTU with the package 9 stored in the transport box 30 is connected to the battery unit BU on the traveling unit DU, and transports the stored package 9 through the autonomous traveling of the current unit DU. As a result, in the storage transport unit RTU, the transport box 30 becomes empty as the transport of the package 9 to its destination is completed.

The control unit CU mainly includes at least one dedicated computer. The dedicated computer constituting the control unit CU has at least one memory 8A and at least one processor 8B. The memory 8A is at least one type of non-transitory tangible storage medium out of, for example, a semiconductor memory, a magnetic medium, an optical medium, and the like that non-transitorily store a computer readable program, data, and the like. The processor 8B includes, as a core, at least one type of, for example, a CPU (Central Processing Unit), a GPU (Graphics Processing Unit), an RISC (Reduced Instruction Set Computer)-CPU, and so on.

The control unit CU is connected to the drive system 3, the sensor system 4, the communication system 5, the map database 6, and the information presentation system 7 via at least one of, for example, a LAN (Local Area Network) line, a wire harness, and an internal bus. The control unit CU is connected to the battery unit BU in a coupled state with the traveling unit DU that holds the control unit CU therein so as to receive power via, for example, a wire harness.

Figure 4:
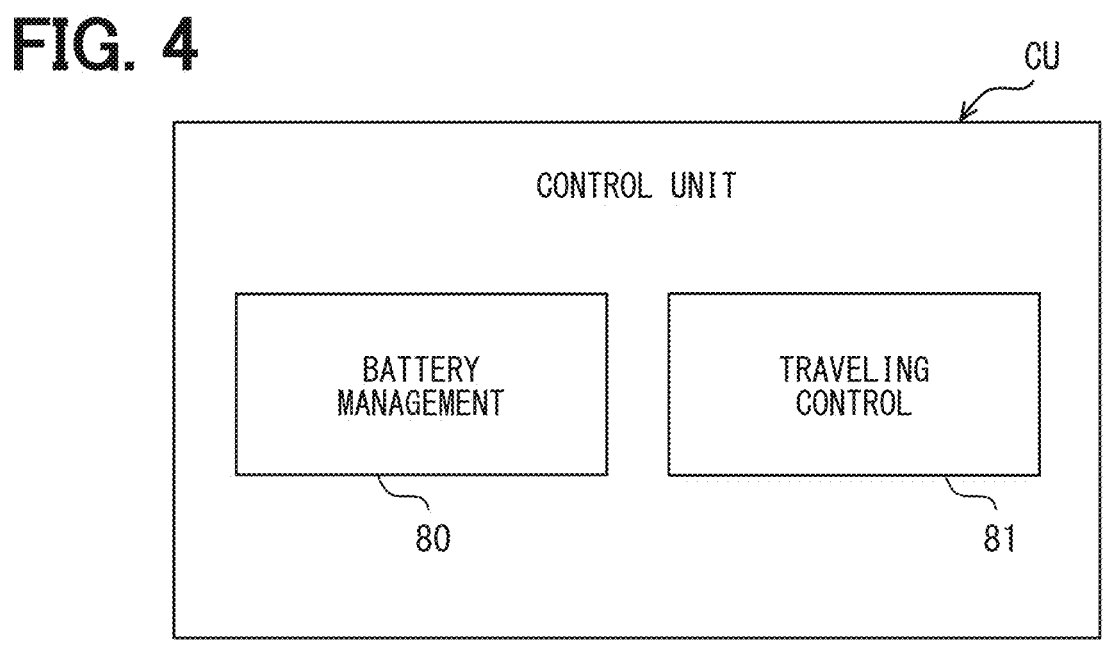

The control unit CU executes a traveling control process to control the autonomous traveling of the autonomous traveling device 10 under the management of the autonomous traveling management system 1 by executing multiple instructions of a control program stored in the memory 8A using the processor 8B. In such a control system 8, multiple functional blocks for executing the traveling control process are constructed. The functional blocks thus constructed include a battery management block 80 and a traveling control block 81, as shown in FIG. 4.

The battery management block 80 manages the charge/discharge state of the battery units BU. In particular, the battery management block 80 monitors an insufficient charge state in which the charge capacity of the battery unit BU falls below a lower limit value of capacity required for transporting the package 9.

The traveling control block 81 controls the autonomous traveling of the autonomous traveling device 10 to transport the package 9 to its destination. In addition, the traveling control block 81 controls a first replacement traveling required for replacing the battery unit BU by the autonomous traveling management system 1 as the autonomous traveling of the autonomous traveling device 10. Furthermore, the traveling control block 81 controls a second replacement traveling required for the exchange of the storage transport unit RTU by the autonomous traveling management system 1 as the autonomous traveling of the autonomous traveling device 10.

Figure 5:
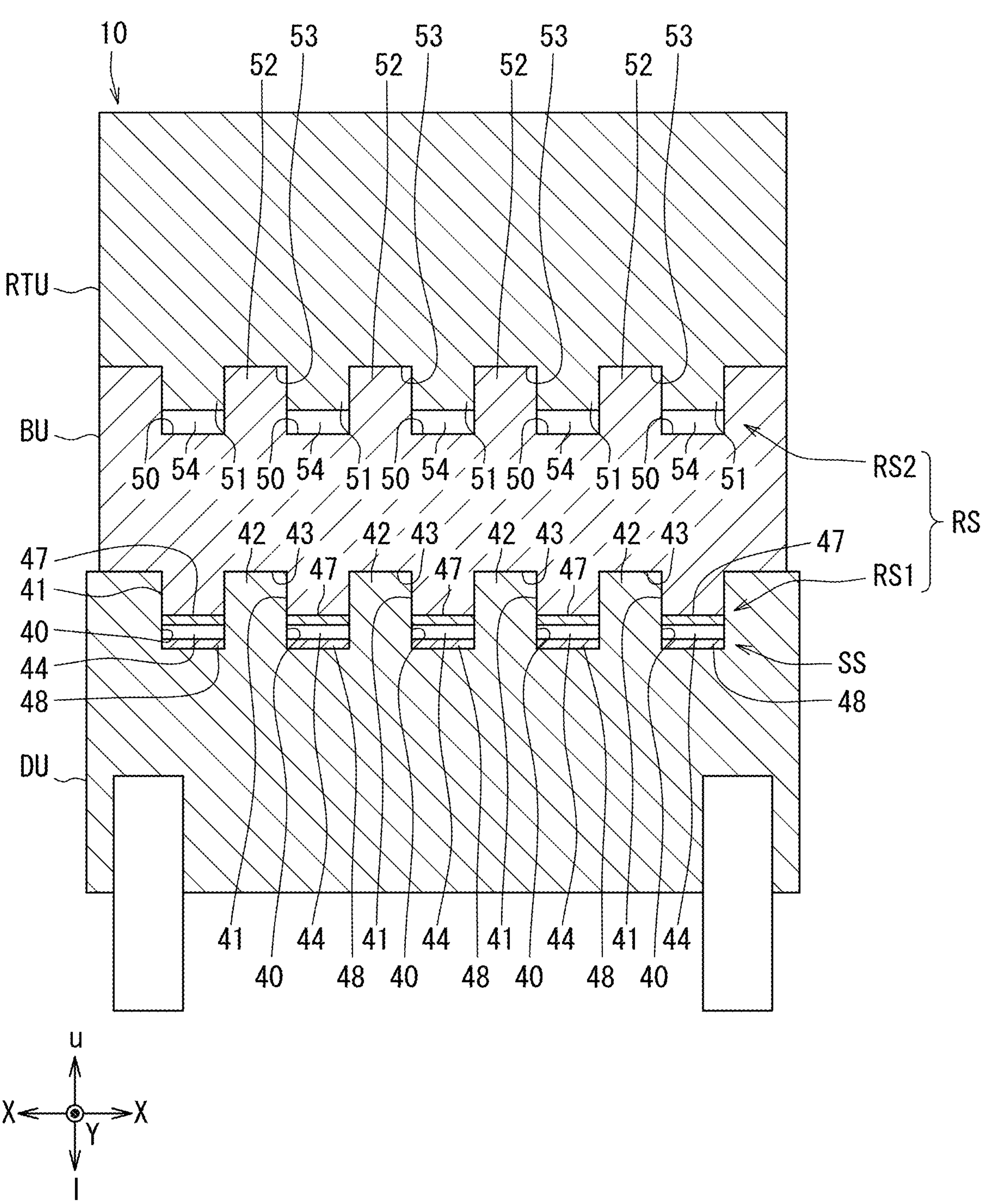
FIG. 5 is a vertical cross-sectional view showing the autonomous traveling device according to the first embodiment.
Figure 6:
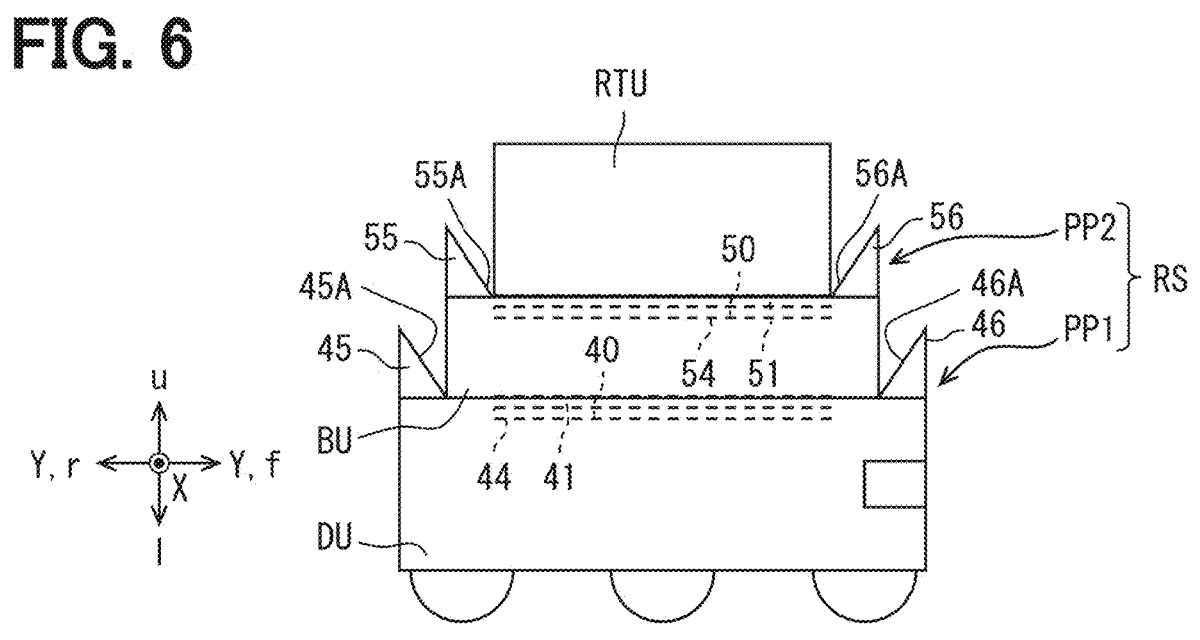

The autonomous traveling device 10 having the configuration described above is further provided with a detachable structure RS and a power supply structure SS, as shown in FIGS. 5 and 6. In particular, the detachable structure RS is configured to include coupling portions RS1, RS2 and positioning portions PP1, PP2.

As shown in FIG. 5, the first coupling portion RS1 is a detachable structure RS that detachably couples the battery unit BU to the traveling unit DU by the convex-concave fitting in the upper-lower direction. The first coupling portion RS1 includes multiple sets of concave portions 40 of the traveling unit DU and convex portions 41 of the battery unit BU, which fit together in a detachable manner, and multiple sets of convex portions 42 of the traveling unit DU and concave portions 43 of the battery unit BU, which fit together in a detachable manner. In other words, the first coupling portion RS1 forms convex-concave fitting by each of multiple pairs of the concave portion 40 of the traveling unit DU and the convex portion 41 of the battery unit BU, and multiple pairs of the convex portion 42 of the traveling unit DU and the concave portion 43 of the battery unit BU.

Figure 7:
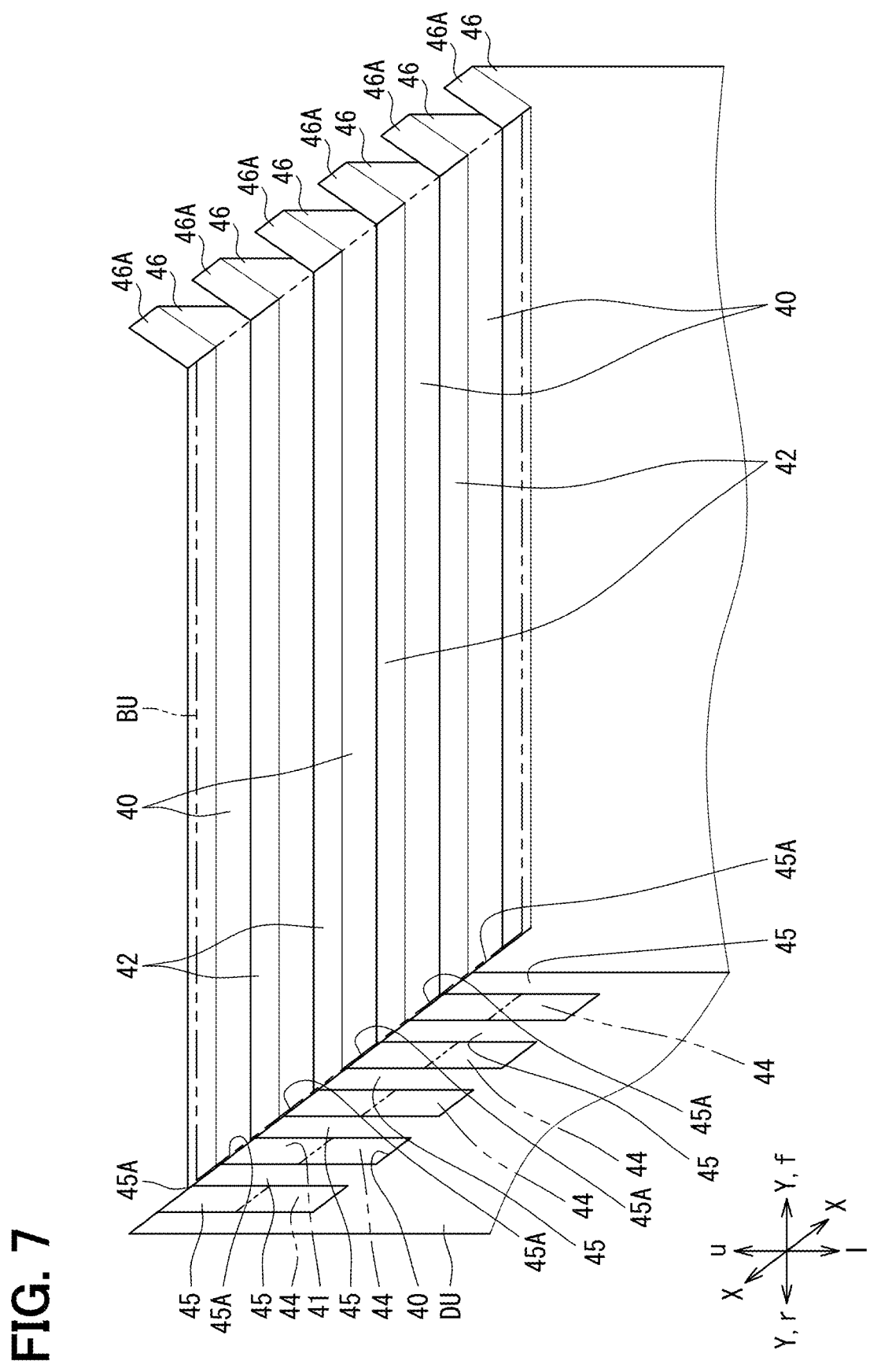
Figure 9:
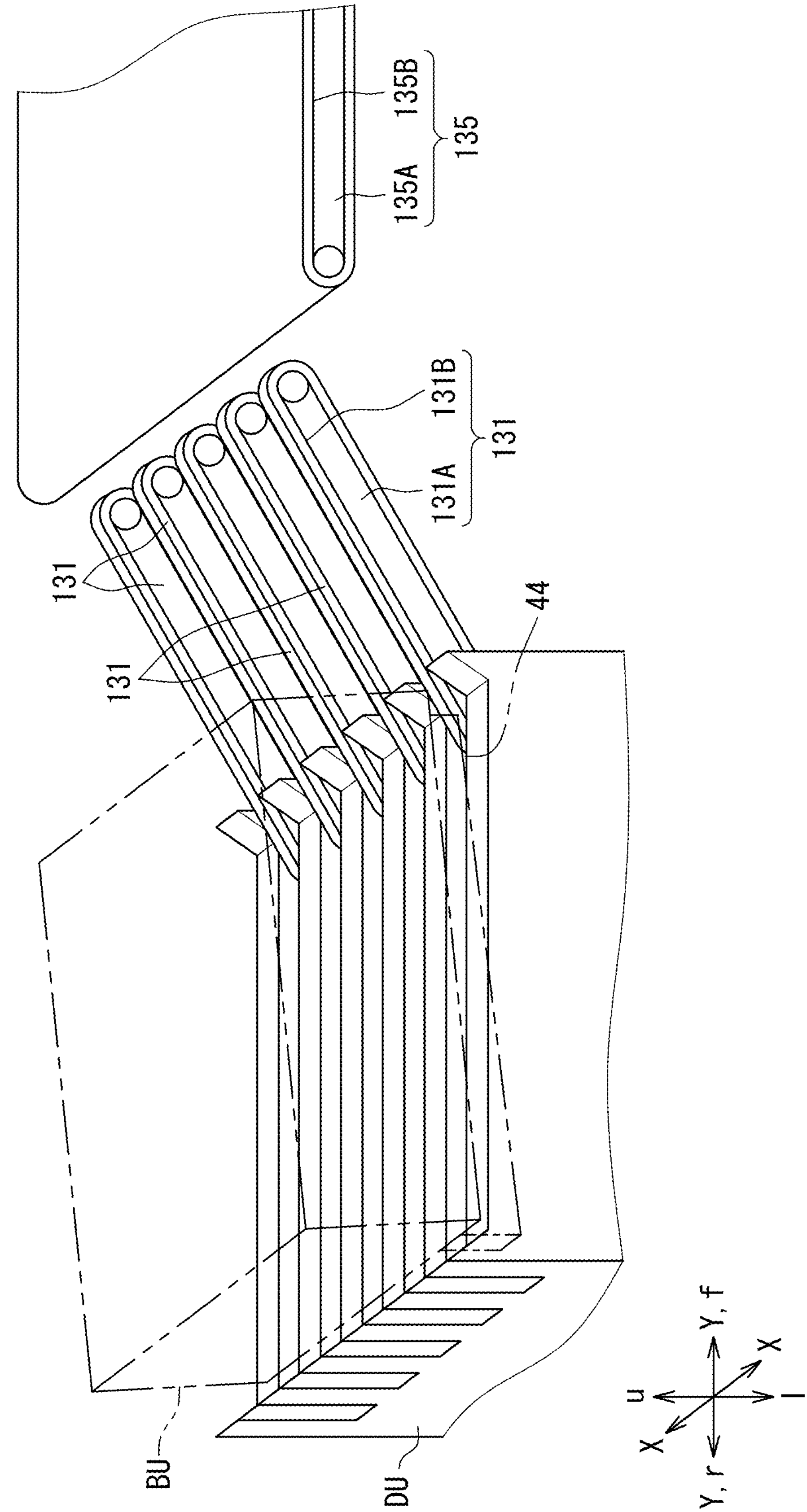
FIG. 9 is a perspective view showing an autonomous traveling management system and the autonomous traveling device according to the first embodiment.
Figure 10:
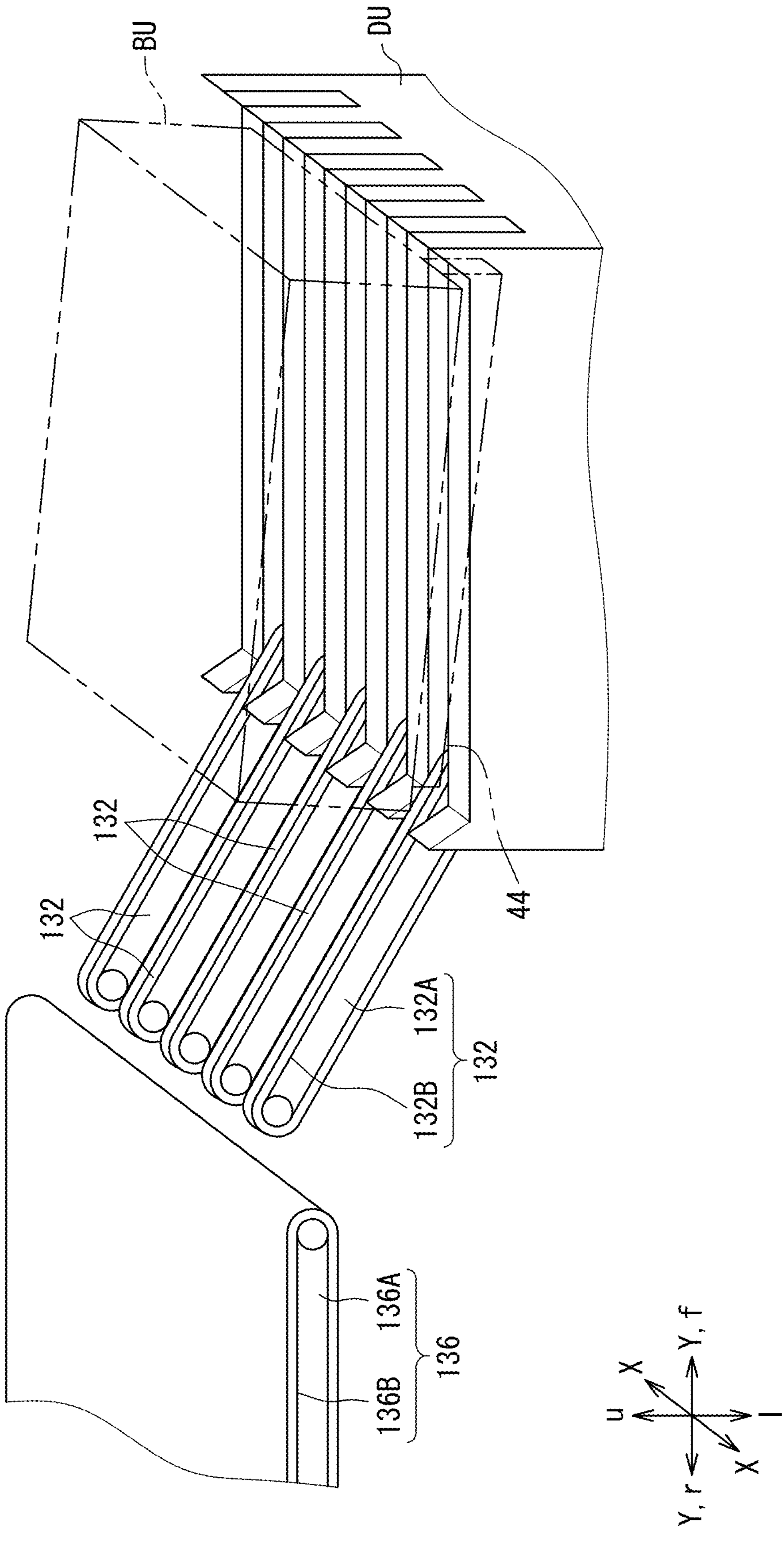
FIG. 10 is a perspective view showing the autonomous traveling management system and the autonomous traveling device according to the first embodiment.

As shown in FIGS. 5 to 7, in the traveling unit DU, the concave portions 40 and the convex portions 42 are arranged alternately in a lateral direction X, and each extends linearly in the front-rear direction Y. In the battery unit BU, the convex portions 41 and concave portions 43 are arranged alternately in multiples in the lateral direction X when the units DU, BU are coupled, and each extends linearly along the front-rear direction Y in the coupled state. The extension direction common to these concave portions 40, 43 and convex portions 41, 42 essentially coincides with the front-rear direction Y where guide rails 131, 132 advance and retreat (in other words, moves forward and backward)

between the units DU and BU in the autonomous traveling management system 1, as shown in FIGS. 9 and 10 described later.

In a longitudinal cross section of FIG. 5 along the lateral direction X of the traveling unit DU, the width between each of the rectangular concave portions 40 and the width between each of the rectangular convex portions 41 are essentially the same. Similarly, in a longitudinal cross section along the lateral direction in the coupled state of the units DU and BU, the widths between each of the rectangular convex portions 42 and the widths between each of the rectangular concave portions 43 are essentially the same.

As shown in FIGS. 5 to 7, 9 and 10, at the coupling points of the first coupling portion RS1 by convex-concave fitting, multiple first fitting gaps 44 are formed through which the guide rails 131, 132 of the autonomous traveling management system 1 can advance and retreat. In particular, each first fitting gap 44 is defined as a space surrounded by the inner surface of the concave portion 40 and the top surface of the convex portion 41 for each pair of the concave portion 40 of the traveling unit DU and the convex portion 41 of the battery unit BU. These first fitting gaps 44 are released from the convex-concave fitting of the first coupling portions RS1 when the battery unit BU is detached from the traveling unit DU. Therefore, for each pair of the convex portion 42 of the traveling unit DU and the concave portion 43 of the battery unit BU, the top surface of the convex portion 42 comes into contact with the bottom surface of the concave portion 43 from above and below, so that each first fitting gap 44 can be maintained in a space of a set size regardless of repeated attachment and detachment.

As shown in FIG. 6, the first positioning portion PP1 positions, between the convex-concave fitting targets detachable by the first coupling portion RS1, the battery unit BU with respect to the other traveling unit DU in the front-rear direction Y in the coupling state of the units BU, DU. As shown in FIGS. 6 and 7, the first positioning portion PP1 includes multiple positioning claws 45, 46 that protrude further upward from each of the convex portions 42 of the traveling unit DU.

Each rear positioning claw 45 is provided at the rear end of the traveling unit DU in the front-rear direction Y. Each rear positioning claw 45 forms a locking portion 45A that locks the battery unit BU coupled with the traveling unit DU from the rear in the front-rear direction Y. The locking portion 45A performs positioning in the same direction Y. Here, the locking portion 45A of each rear positioning claw 45 is formed in an inclined shape that is inclined backward in the front-rear direction Y as it goes upward. As a result, the locking portion 45A of each rear positioning claw 45 is capable of locking, with its inclined lower end, the battery unit BU in a horizontal position along the lateral direction X and the front-rear direction Y on the traveling unit DU. Furthermore, in a situation where the battery unit BU is received through the guide rail 131 as shown in FIG. 9 described later, the locking portion 45A of each rear positioning claw 45 is capable of locking the battery unit BU with, for example, the entire of inclined surface or the like. The battery unit BU is locked from the opposite position to the front position of the rail 131 in the forward-backward direction with respect to the traveling unit DU.

As shown in FIGS. 6 and 7, each front positioning claw 46 is provided at the front end of the traveling unit DU in the front-rear direction Y. Each front positioning claw 46 forms a locking portion 46A that locks the battery unit BU coupled with the traveling unit DU from the front in the front-rear direction Y, thereby positioning the battery unit BU in the same direction Y. Here, the locking portion 46A of each front positioning claw 46 is formed in the inclined shape that slopes forward in the front-rear direction Y as it approaches the upper position. As a result, the locking portion 46A of each front positioning claw 46 is capable of locking the battery unit BU in the horizontal posture along the lateral direction X and the front-rear direction Y on the traveling unit DU with its inclined lower end. Furthermore, in a situation where the battery unit BU is received from the guide rail 132 as shown in FIG. 10 described later, the locking portion 46A of each front positioning claw 46 is capable of locking the battery unit BU with, for example, the entire of inclined surface or the like. The battery unit BU is locked from the opposite position to the rear position of the rail 132 in the forward-backward direction with respect to the traveling unit DU.

As shown in FIG. 5, the power supply structure SS is constructed so as to contactlessly supply power from the battery unit BU to the traveling unit DU via each of the first fitting gaps 44. The power supply structure SS includes multiple pairs of electrode portions 47 in the battery unit BU and electrode portions 48 in the traveling unit DU to implement the contactless power supply of an electric field coupling type with each first fitting gap 44 serving as an insulating layer. The electrode portion 47 in the battery unit BU and the electrode portion 48 in the traveling unit DU are provided at locations that sandwich each first fitting gap 44 in the coupled state of the units BU, DU, i.e., at each pair of the convex portion 41 and the concave portion 40.

In the battery unit BU, each electrode portion 47 is placed on the top surface of the corresponding convex portion 41 to form a power transmission antenna portion for the contactless power supply. In the battery unit BU, a high frequency current is applied to each electrode portion 47 while the units BU and DU are in a coupled state so as to output the charging power stored in the battery pack 21.

In the traveling unit DU, each electrode portion 48 is placed on the bottom surface of the inner surface of the corresponding concave portion 40, thereby forming a power reception antenna portion for contactless power supply. In the traveling unit DU, in the coupled state of the units BU and DU, a high-frequency current is applied to each electrode portion 47 in the battery unit BU. In response, a high-frequency current also flows through each electrode portion 48. Thereby, the power is transmitted from the battery unit BU. The power transmitted in this manner is distributed to the drive system 3, the sensor system 4, the communication system 5, the map database 6, the information presentation system 7, and the control unit CU via, for example, a wire harness.

In the vertical cross section of FIG. 5 taken along the lateral direction X in the coupled state of the units DU and BU, the width between the electrode portions 47 in the battery unit BU is essentially made common to the width between the respective convex portions 41 that are the placement destination. Similarly, in the vertical section along the lateral direction X in the coupled state of the units DU and BU, the width between the electrode portions 48 in the traveling unit DU is essentially made common to the width between the respective concave portions 40 that are the placement destination.

As shown in FIG. 5, the second coupling portion RS2 is a detachable structure RS that further couples the storage transport unit RTU to the battery unit BU coupled to the traveling unit DU in the detachable manner by the convex-concave fitting in the upper-lower direction. The second coupling portion RS2 includes multiple sets of concave portions 50 of the battery unit BU and convex portions 51 of the storage transport unit RTU, which fit together in the detachable manner, and multiple sets of convex portions 52 of the battery unit BU and concave portions 53 of the storage transport unit RTU, which fit together in the detachable manner. In other words, the second coupling portion RS2 forms the convex-concave fitting by each of multiple pairs of the concave portion 50 of the battery unit BU and the convex portion 51 of the storage transport unit RTU, and multiple pairs of the convex portion 52 of the battery unit BU and the concave portion 53 of the storage transport unit RTU.

Figure 8:
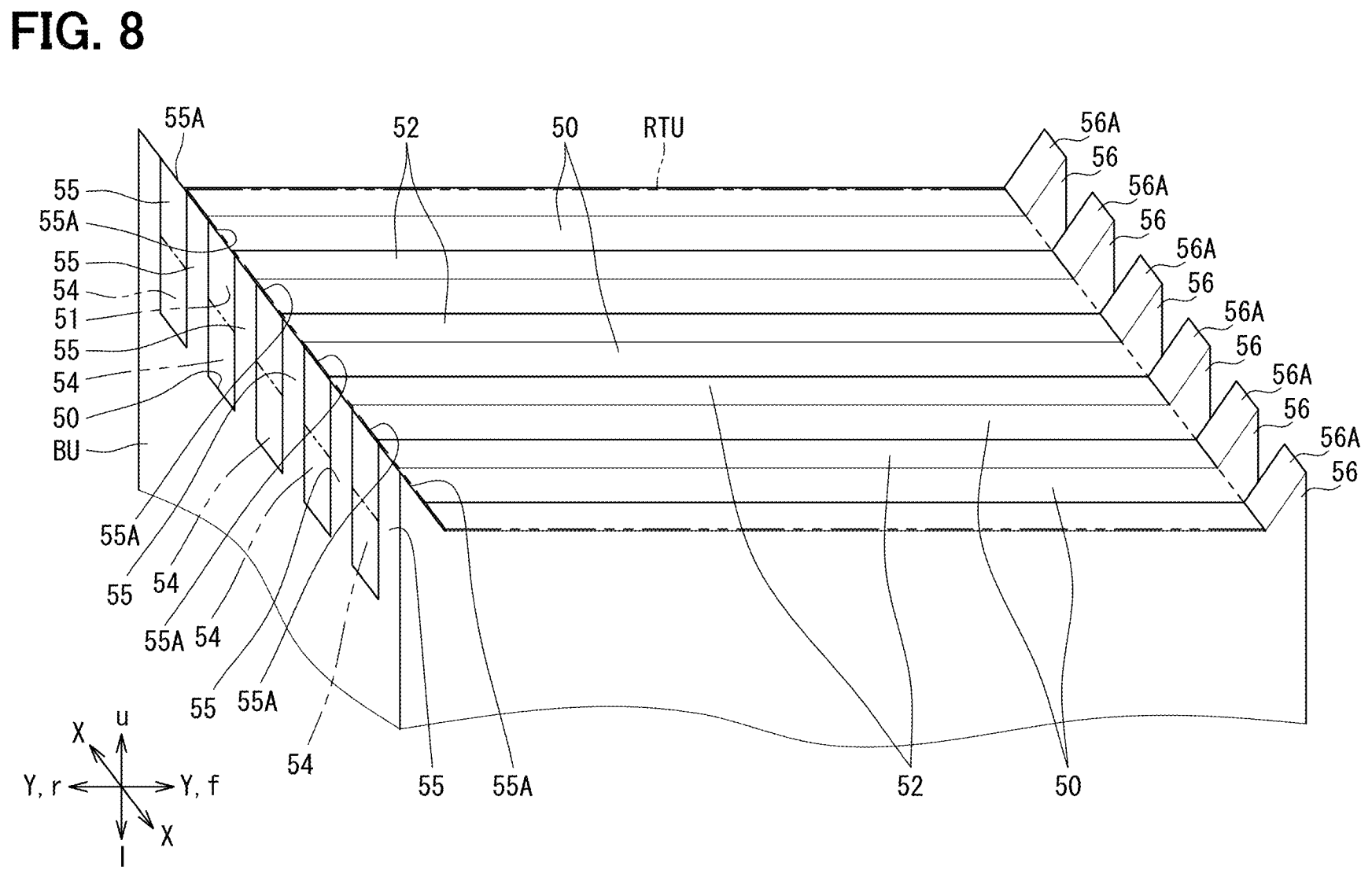
Figure 11:
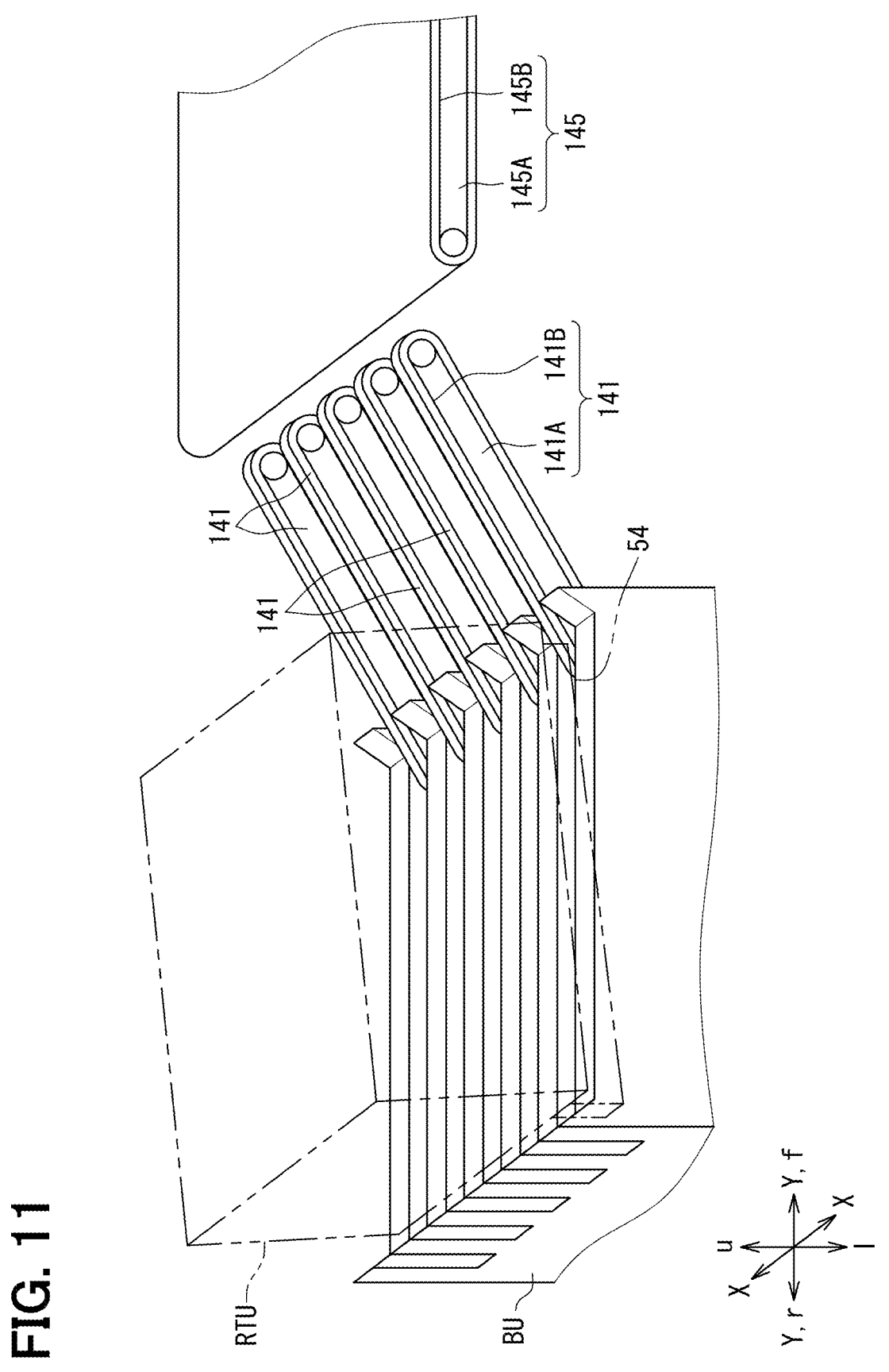
Figure 12:
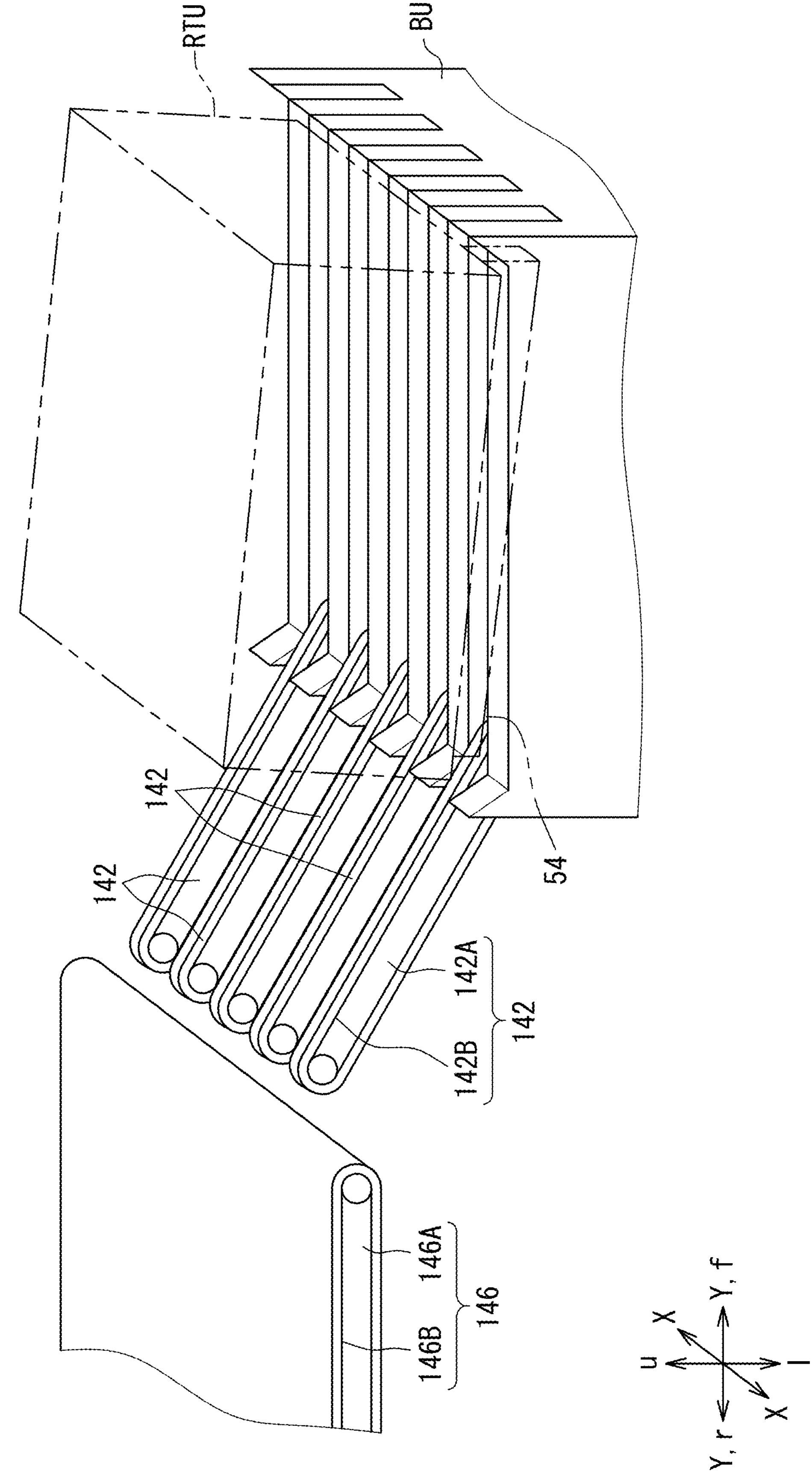
FIG. 12 is a perspective view showing the autonomous traveling management system and the autonomous traveling device according to the first embodiment.

As shown in FIGS. 5, 6, and 8, in the battery unit BU, the concave portions 50 and the convex portions 52 are arranged alternately in multiples in the lateral direction X in the coupled state of the units DU and BU, and each extends linearly along the front-rear direction Y. In the storage transport unit RTU, the convex portions 51 and concave portions 53 are arranged alternately in multiples in the lateral direction X in the coupled state of the units BU and RTU on the traveling unit DU, and each extend linearly along the front-to-rear direction Y in the coupled state. The extension direction common to these concave portions 50, 53 and convex portions 51, 52 essentially coincides with the front-rear direction Y where guide rails 141, 142 advance and retreat between the units BU and RTU in the autonomous traveling management system 1, as shown in FIGS. 11 and 12 described later.

In a vertical section of FIG. 5 taken along the lateral direction X in the coupled state of units BU and RTU on the traveling unit DU, the widths between each of the rectangular concave portions 50 and the widths between each of the rectangular convex portions 51 are essentially the same. Similarly, in the vertical section along the lateral direction X in the coupled state of the units BU and RTU on the traveling unit DU, the widths between each of the rectangular convex portions 52 and the widths between each of the rectangular concave portions 53 are essentially the same.

As shown in FIGS. 5, 6, 8, 11 and 12, multiple second fitting gaps 54 are formed at the coupling points of the second coupling portion RS2 by the convex-concave fitting, through which the guide rails 141, 142 of the autonomous traveling management system 1 can advance and retreat. Each second fitting gap 54 is defined as a space surrounded by the inner surface of the concave portion 50 and the top surface of the convex portion 51 for each pair of the concave portion 50 of the battery unit BU and the convex portion 51 of the storage transport unit RTU. Each of these second fitting gaps 54 is released from the convex-concave fitting of the second coupling portions RS2 while the storage transport unit RTU is detached from the battery unit BU on the traveling unit DU by releasing the coupling. Therefore, for each pair of the convex portion 52 of the battery unit BU and the concave portion 53 of the storage transport unit RTU, the top surface of the convex portion 52 comes into contact with the bottom surface of the concave portion 53 in the upper-lower direction, so that each second fitting gap 54 can be maintained in a space of a set size regardless of repeated attachment and detachment.

As shown in FIG. 6, the second positioning portion PP2 positions one of the convex-concave fitting objects that can be attached and detached by the second coupling portion RS2, the storage transport unit RTU, with respect to the other battery unit BU in the front-rear direction Y in the coupled state of the units RTU, BU on the traveling unit DU. As shown in FIGS. 6 and 8, the second positioning portion PP2 includes multiple positioning claws 55, 56 that protrude further upward from each convex portion 52 of the battery unit BU on the traveling unit DU.

Each rear positioning claw 55 is provided at a location that is the rear end in the front-rear direction Y of the battery unit BU coupled onto the traveling unit DU. Each rear positioning claw 55 forms a locking portion 55A that locks the storage transport unit RTU coupled with the battery unit BU on the traveling unit DU from the rear in the front-rear direction Y. Thereby, the locking portion 55A performs positioning of the storage transport unit RTU in the same direction Y. Here, the locking portion 55A of each rear positioning claw 55 is formed in an inclined shape that is inclined backward in the front-rear direction Y as it approaches the upper position. As a result, the locking portions 55A of each rear positioning claw 55 are capable of locking the storage transport unit RTU in a horizontal position along the lateral direction X and the front-rear direction Y on the traveling unit DU and the battery unit BU, with their inclined lower ends. Furthermore, in a situation where the storage transport unit RTU is received through the guide rail 141 as shown in FIG. 11 described later, the locking portion 55A of each rear positioning claw 55 is capable of locking the storage transport unit RTU with, for example, the entire of inclined surface or the like. The storage transport unit RTU is locked from the opposite position to the front position of the rail 141 in the forward-backward direction with respect to the battery unit BU.

As shown in FIGS. 6 and 8, each front positioning claw 56 is provided at a location that is the front end in the front-rear direction Y of the battery unit BU coupled onto the traveling unit DU. Each front positioning claw 56 forms a locking portion 56A that locks the storage transport unit RTU coupled with the battery unit BU on the traveling unit DU from the front in the front-rear direction Y. Thereby, the locking portion 56A performs positioning of the storage transport unit RTU in the same direction Y. Here, the locking portion 56A of each front positioning claw 56 is formed in the inclined shape that slopes forward in the front-rear direction Y as it approaches the upper position. As a result, the locking portions 56A of each front positioning claw 56 are capable of locking the storage transport unit RTU in a horizontal posture along the lateral direction X and the front-rear direction Y on the traveling unit DU and the battery unit BU, with their inclined lower ends. Furthermore, in a situation where the storage transport unit RTU is received from the guide rail 142 as shown in FIG. 12 described later, the locking portion 56A of each front positioning claw 56 is capable of locking the storage transport unit RTU with, for example, the entire of inclined surface or the like. The storage transport unit RTU is locked from the opposite position to the rear position of the rail 142 in the forward-backward direction with respect to the battery unit BU.

The autonomous traveling management system 1 shown in FIG. 1 is constructed in a management center that remotely manages multiple autonomous traveling devices 10. An infrastructure system that forms the structural basis of the autonomous traveling management system 1 includes a charging subsystem 130 and a picking subsystem 140. The charging subsystem 130 includes the charging station CS, the first guide rails 131 and 132, and first conveyor portions 135 and 136. The picking subsystem 140 includes the picking station PS, the second guide rails 141 and 142, and second conveyor portions 145 and 146.

As shown in FIGS. 1 and 9, multiple first guide rails (hereinafter referred to as receiving side first guide rails) 131 at the position for receiving the battery unit BU from the traveling unit DU of the autonomous traveling device 10 are provided so as to individually advance and retreat with respect to each first fitting gap 44 between the units DU and BU. Each first guide rail 131 at the receiving position is placed so as to extend and incline downward as it approaches the position for receiving the battery unit BU. Each receiving side first guide rail 131 receives an under-charged battery unit BU from the traveling unit DU by synchronously driving a movable conveyor portion 131B supported by a respective fixed rail portion 131A.

At least one first conveyor portion 135 (hereinafter referred to as receiving side first conveyor portion) at the position for receiving the battery unit BU is provided along a path from the multiple receiving side first guide rails 131 to the charging station CS. The receiving side first conveyor portion 135 conveys the insufficient charge battery units BU received from each receiving side first guide rail 131 to the charging station CS by driving a movable conveyor portion 135B supported by a fixed base portion 135A.

In the charging station CS shown in FIG. 1, the battery unit BU that has been in the insufficient charge state and transported by the receiving side first conveyor portion 135 is set at a predetermined charging spot. At the charging station CS, the battery pack 21 of the battery unit BU set at the charging spot is automatically or manually charged with power supplied from a power supply source.

As shown in FIGS. 1 and 10, at least one first conveyor portion (hereinafter referred to as the delivering side first conveyor portion) 136 at the position for transferring the battery unit BU to the traveling unit DU of the autonomous traveling device 10 is provided along a path from the charging station CS to multiple first guide rails (hereinafter referred to as the delivering side first guide rails) 132 at the position for delivering it. The delivering side first conveyor portion 136 conveys the fully charged battery units BU received from the charging station CS to each delivering side first guide rail 132 by driving a movable conveyor portion 136B supported by a fixed base portion 136A.

The delivering side first guide rails 132 are provided in multiple so as to be individually movable forward and backward with respect to each of the first fitting gaps 44 between the units DU and BU. Each of the delivering side first guide rails 132 is placed so as to extend and incline downward as it approaches the delivery position of the battery unit BU. Each of the delivering side first guide rails 132 transfers the fully charged battery unit BU received from the delivering side first conveyor portion 136 to the traveling unit DU by synchronously driving movable conveyor portions 132B supported by respective fixed base portions 132A.

In this manner, in the charging subsystem 130 of the autonomous traveling management system 1, each receiving side first guide rail 131 and each delivering side first guide rail 132 individually guide the battery unit BU between the traveling unit DU and the charging station CS.

As shown in FIGS. 1 and 11, the second guide rail (hereinafter referred to as the receiving side second guide rail) 141 at the position for receiving the storage transport unit RTU from the battery unit BU on the traveling unit DU in the autonomous traveling device 10 is provided in multiple so as to advance and retreat individually into and from each second fitting gap 54 between the units BU and RTU. Each receiving side second guide rail 141 is placed so as to extend and incline downward as it approaches the receiving position of the storage transport unit RTU. Each receiving side second guide rail 141 receives an empty storage transport unit RTU from the battery unit BU by synchronously driving a movable conveyor portion 141B supported by each fixed rail portion 141A.

At least one second conveyor portion 145 (hereinafter referred to as the receiving side second conveyor portion) at the position for receiving the storage transport unit RTU is provided along the path from the multiple receiving side second guide rails 141 to the picking station PS. The receiving side second conveyor portion 145 transports the empty storage transport unit RTU received from each receiving side second guide rail 141 to the picking station PS by driving a movable conveyor portion 145B supported by a fixed base portion 145A.

In the picking station PS shown in FIG. 1, an empty storage transport unit RTU transported by the receiving side second conveyor portion 145 is set in a predetermined storage spot. At the picking station PS, the package 9 to be transported is automatically or manually stored in the transport box 30 of the storage transport unit RTU set in the storage spot.

As shown in FIGS. 1 and 12, at least one second conveyor portion (hereinafter referred to as a delivering side second conveyor portion) 146 at the position for delivering the storage transport unit RTU to the battery unit BU on the traveling unit DU in the autonomous traveling device 10 is provided along the path from the picking station PS to multiple second guide rails (hereinafter referred to as delivering side second guide rails) 142 at the delivering position. The delivering side second conveyor portion 146 transports the storage transport unit RTU having stored the package and received from the picking station PS to each delivering side second guide rail 142 by driving a movable conveyor portion 146B supported by a fixed base portion 146A.

The delivering side second guide rails 142 are provided in multiple so as to individually advance and retreat with respect to each of the second fitting gaps 54 between the units BU and RTU. Each of the delivering side second guide rails 142 is placed to extend and incline downward as it approaches the delivery position of the storage transport unit RTU. Each of the delivering side second guide rails 142 transfers the storage transport unit RTU in the package storage state received from the delivering side second conveyor portion 146 to the battery unit BU by synchronous driving of a movable conveyor portion 142B supported by a fixed base portion 142A.

In this way, in the picking subsystem 140 of the autonomous traveling management system 1, each receiving side second guide rail 141 and each delivering side second guide rail 142 individually guides the storage transport unit RTU between the battery unit BU and the picking station PS.

Figure 13:
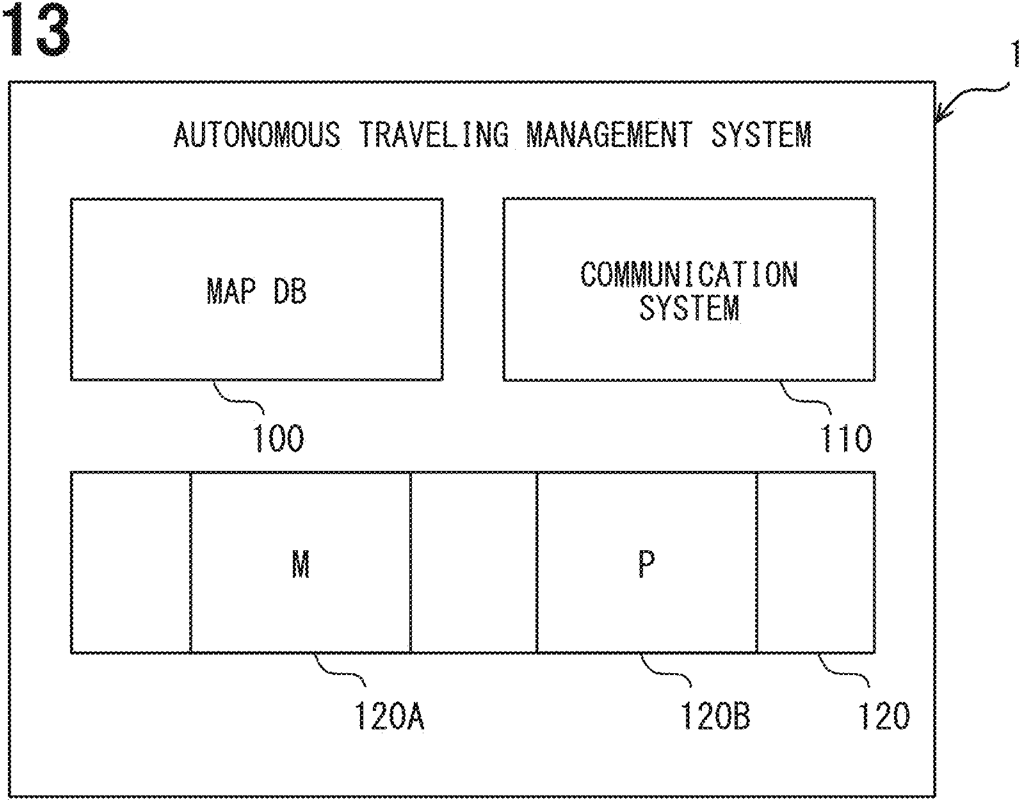
FIG. 13 is a block diagram showing the autonomous traveling management system according to the first embodiment.

As shown in FIG. 13, the control system that controls the infrastructure system in the autonomous traveling management system 1 includes a map database 100, a communication system 110, and a processing device 120, and is at least one type of system, such as a cloud server or an edge server, for example. The map database 100 stores map information used to manage each autonomous traveling device 10, and updates the map information to the latest information as needed. The configuration of the map database 100 in the autonomous traveling management system 1 is similar to the configuration of the map database 6 in the autonomous traveling device 10, but stores a large amount of map information capable of covering the autonomous traveling areas (hereinafter referred to as management areas) of all autonomous traveling devices 10 that are under management.

The communication system 110 mainly includes communication equipment that serves as at least a part of a V2X system capable of communicating with the communication system 5 of each autonomous traveling device 10. The processing device 120 is connected to the map database 100 and the communication system 110 via at least one of a wired communication line and a wireless communication line. Regarding the future traveling of each autonomous traveling device 10, target traveling information is obtained through the communication system 110, includes, for example, destination information for the package 9, traveling route information, and schedule information, and may be provided to the processing device 120 at any time or planned by the processing device 120. Regarding the management area of each autonomous traveling device 10, in addition to the map information in the map database 100, it is preferable that, for example, at least one type of environmental information, such as traveling route information, traffic information, and scene information, be obtained through the communication system 110 and provided to the processing device 120 at any time.

The processing device 120 includes at least one dedicated computer. The dedicated computer constituting the processing device 120 includes at least one memory 120A and at least one processor 120B. The configuration of the memory 120A and the processor 120B in the processing device 120 is similar to the configuration of the memory 8A and the processor 8B of the control unit CU in the autonomous traveling device 10, but has a more sophisticated configuration than the latter memory 8A and the latter processor 8B.

In the autonomous traveling management system 1, the processing device 120 executes a management process to manage charging and storage of package 9 for each autonomous traveling device 10 by executing multiple instructions of a processing program stored in the memory 120A using the processor 120B. In such a processing device 120, multiple functional blocks for executing the management process are constructed. The functional blocks thus constructed include reception management blocks 150 and 160, delivery management blocks 151 and 161, a charging management block 170, and a storage management block 180, as shown in FIG. 14.

The first reception management block 150 manages a first reception process, which includes an advancement and retreat process of each receiving side first guide rail 131 with respect to each first fitting gap 44, as the process of receiving an insufficiently charge battery unit BU from the traveling unit DU of the autonomous traveling device 10. The first delivery management block 151 manages a first delivery process, which includes an advancement and retreat process of each delivering side first guide rail 132 with respect to each first fitting gap 44, as the process of delivering a fully charged battery unit BU to the traveling unit DU of the autonomous traveling device 10. With such a first reception management block 150 and a first delivery management block 151, in a first reception phase AP1 and a first delivery phase DP1 shown in FIG. 15 described later, the forward-backward movement of the respective receiving side first guide rail 131 and the delivering side first guide rail 132 into the common first fitting gap 44 is managed as shown in FIG. 1.

Figure 14:
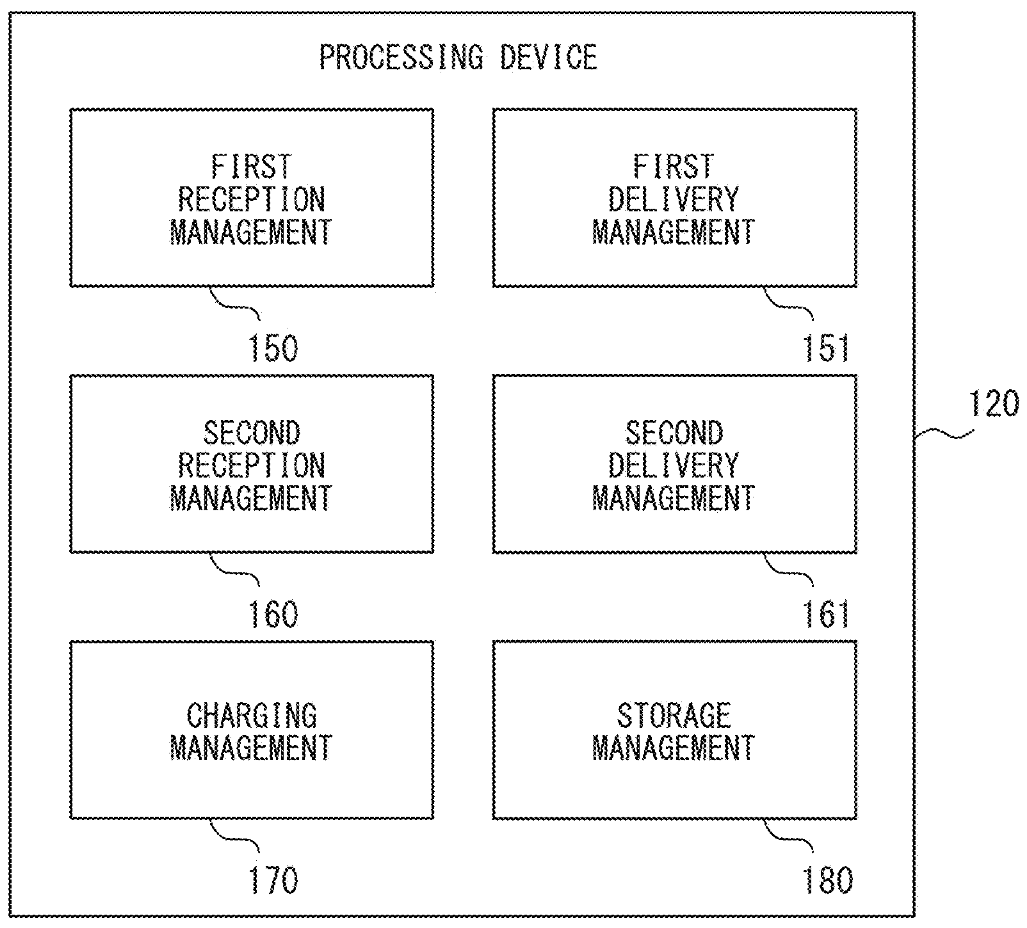
FIG. 14 is a block diagram showing a processing device of the autonomous traveling management system according to the first embodiment.

The second reception management block 160 shown in FIG. 14 manages a second reception process, which includes an forward-backward movement process of each receiving side second guide rail 141 with respect to each second fitting gap 54, as a process of receiving the empty storage transport unit RTU from the battery unit BU on the traveling unit DU in the autonomous traveling device 10. The second delivery management block 161 manages a second delivery process, which includes the forward-backward movement process of each delivering side second guide rail 142 with respect to each second fitting gap 54, as a process of delivering the storage transport unit RTU storing the package to the battery unit BU on the traveling unit DU in the autonomous traveling device 10. With such a second reception management block 160 and a second delivery management block 161, in a second reception phase AP2 and the second delivery phase DP2 shown in FIG. 15 described later, the forward-backward movement of the separate receiving side second guide rail 141 and the delivering side second guide rail 142 into the common second fitting gap 54 is managed as shown in FIG. 1.

The charging management block 170 shown in FIG. 14 manages the charging process by the charging station CS of the battery unit BU received from the traveling unit DU in the autonomous traveling device 10. The storage management block 180 manages the storage process of the package 9 by the picking station PS in the storage transport unit RTU received from the battery unit BU on the traveling unit DU in the autonomous traveling device 10.

Figure 15:
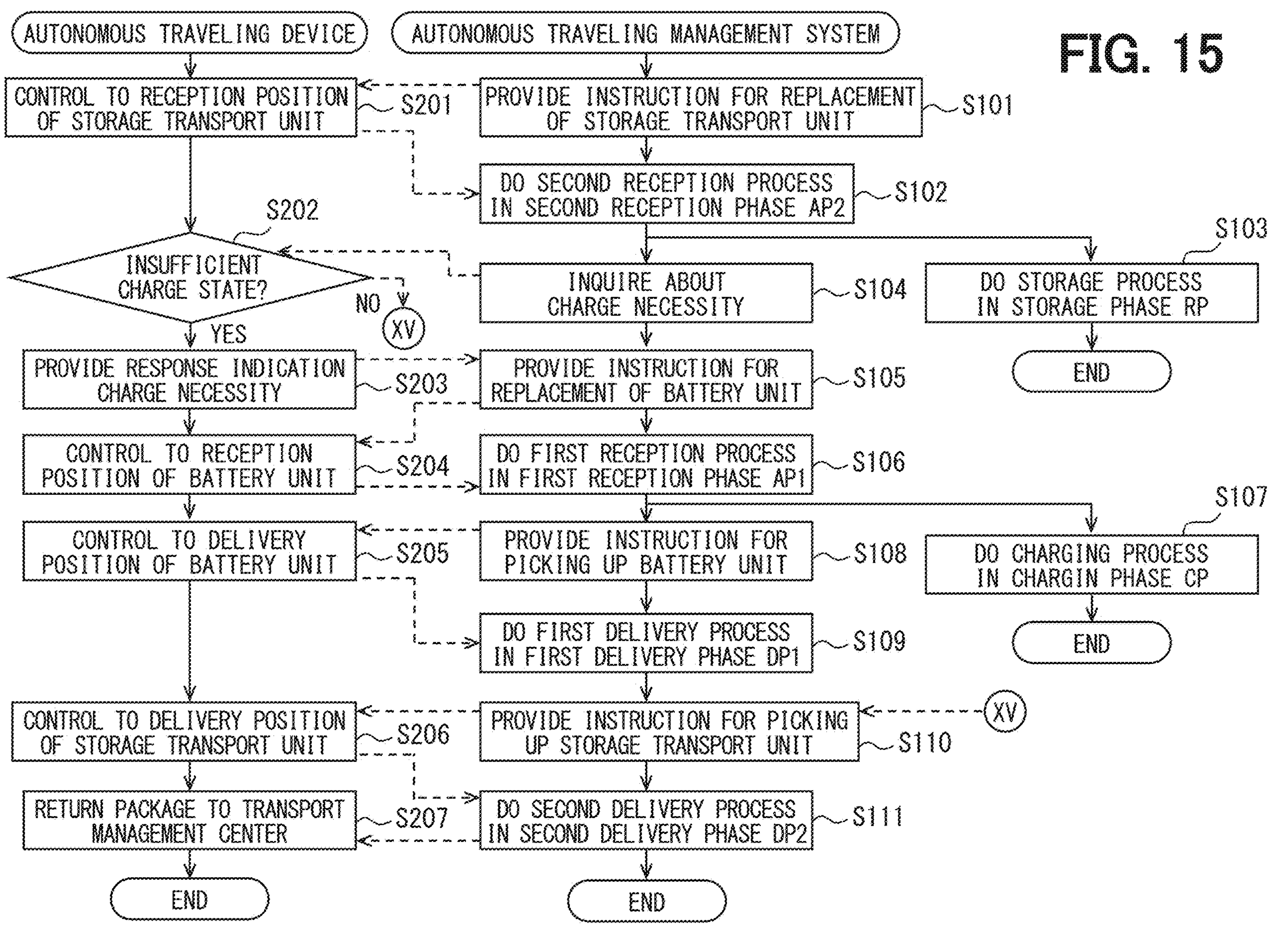
FIG. 15 is a flowchart showing a management flow according to the first embodiment.

In a management method, the processing device 120 in the autonomous traveling management system 1 manages charging and package storage for each autonomous traveling device 10 by cooperation of these blocks 150, 151, 160, 161, 170, and 180. The method is executed as a management flow shown in FIG. 15. In each autonomous traveling device 10 managed at this time, the above-described blocks 80 and 81 cooperate to implement charge/discharge management and traveling control according to the management, as shown in FIG. 15. This management flow is executed repeatedly while the autonomous traveling management system 1 is running. Moreover, each "S" in this management flow represents multiple processes executed by multiple instructions contained in the navigation program.

In S101, the second reception management block 160 of the autonomous traveling management system 1 instructs the autonomous traveling device 10 transporting the storage transport unit RTU that is empty of package 9, via the communication system 110, 5, to exchange the unit RTU that has undergone the second exchange traveling. At this time, in the second reception management block 160, the autonomous traveling device 10 suitable for the next package 9 to be transported is selected from among the autonomous traveling devices 10 that have not yet executed any control tasks, such as a transport task.

The traveling control block 81 of the autonomous traveling device 10, which receives an instruction to replace the storage transport unit RTU, controls the traveling position of the traveling unit DU to the receiving position of the unit RTU by each receiving side second guide rail 141 of the autonomous traveling management system 1 in S201. At this time, the traveling control block 81 fine-tunes the traveling position of the traveling unit DU so that each receiving side second guide rail 141 enters the second fitting gap 54 from the front in the front-rear direction Yn (in other words, in the front-rear direction, the rear portion of the rail 141 may first enter the gap 54), and the traveling position reaches the receiving position of the storage transport unit RTU.

In S102, the second reception management block 160 of the autonomous traveling management system 1 executes a second reception process in the second reception phase AP2 for the autonomous traveling device 10 whose receiving side second guide rails 141 have entered the second fitting gaps 54. Specifically, the second reception management block 160 receives the storage transport unit RTU from the battery unit BU on the traveling unit DU in the autonomous traveling device 10 by synchronously driving the movable conveyor portions 141B of each receiving side second guide rail 141. Further, the second reception management block 160 also drives the movable conveyor portion 145B of the receiving side second conveyor portion 145 to transport the received storage transport unit RTU to the picking station PS.

In S103, the storage management block 180 of the autonomous traveling management system 1 executes a storage process in the storage phase RP on the storage transport unit RTU that has been transported to the picking station PS. At this time, in the picking station PS, the empty storage transport unit RTU is set in the storage spot. Furthermore, in the picking station PS, the package 9 to be transported is automatically or manually stored in a storage transport unit RTU set in the storage spot.

In parallel with S103, the first reception management block 150 of the autonomous traveling management system 1 inquires of the autonomous traveling device 10 that has detached from the storage transport unit RTU by the second reception process via the communication systems 110, 5 as to whether charging is required in S104.

The battery management block 80 of the autonomous traveling device 10 that has received the inquiry determines in S202 whether the battery unit BU is in the insufficient charge state, that is, the charge capacity falls below the lower limit capacity required to transport the package 9 to the scheduled destination. When a positive determination is made in S202, the battery management block 80 responds to the autonomous traveling management system 1 via the communication systems 5, 110 in S203 to inform the autonomous traveling management system 1 of the need to charge the battery unit BU.

When a response indicating the need for charging is received, the first reception management block 150 in the autonomous traveling management system 1 instructs the autonomous traveling device 10 requiring charging to replace the battery unit BU that has undergone the first replacement traveling via the communication systems 110, 5 in S105.

When the autonomous traveling device 10 receives an instruction to replace the battery unit BU, the traveling control block 81 moves the traveling position of the traveling unit DU away from the receiving position of the storage transport unit RTU by S204 so that each receiving side second guide rail 141 exits each second fitting gap 54. Further, in S204, the traveling control block 81 controls the traveling position of the traveling unit DU to the receiving position of the battery unit BU by each receiving side first guide rail 131 of the autonomous traveling management system 1. At this time, the traveling control block 81 fine-tunes the traveling position of the traveling unit DU so that each receiving side first guide rail 131 enters each first fitting gap 44 from the front side in the front-rear direction Y, and the traveling position reaches the receiving position of the battery unit BU.

In S106, the first reception management block 150 of the autonomous traveling management system 1 executes a first reception process in the first reception phase AP1 for the autonomous traveling device 10 whose receiving side first guide rails 131 have entered the first fitting gaps 44. Specifically, the first reception management block 150 receives the battery unit BU from the traveling unit DU in the autonomous traveling device 10 by synchronously driving the movable conveyor portions 131B of each receiving side first guide rail 131. Furthermore, the first reception management block 150 drives the movable conveyor portion 135B of the receiving side first conveyor portion 135 to transport the received battery unit BU to the charging station CS.

In S107, the charging management block 170 of the autonomous traveling management system 1 executes the charging process in a charging phase CP on the battery unit BU that has been transported to the charging station CS. At this time, in the charging station CS, the battery unit BU in the insufficient charge state is set at the charging spot. Furthermore, in the charging station CS, the battery unit BU set at the charging spot is automatically or manually charged with power supplied from a power supply source. The battery unit BU is charged until it is fully charged. Thereafter, the autonomous traveling device 10 in need of charging, which has been determined to be positive in S202, i.e., the autonomous traveling device 10 in need of replacement with the unit BU in the fully charged state, is stored in the charging station CS until whether the charge necessity is determined.

In parallel with S107, the first delivery management block 151 of the autonomous traveling management system 1 instructs the autonomous traveling device 10, from which the battery unit BU has been detached by the first reception process of S106, to pick up the battery unit BU that has undergone the first exchange traveling via the communication systems 110, 5 in S108.

Upon receiving the instruction to pick up the battery unit BU, the traveling control block 81 of the autonomous traveling device 10 moves the traveling position of the traveling unit DU away from the receiving position of the battery unit BU by S205 so that each receiving side first guide rail 131 exits each first fitting gap 44. Furthermore, in S205, the traveling control block 81 controls the traveling position of the traveling unit DU to the delivering position of the battery unit BU by each delivering side first guide rail 132 of the autonomous traveling management system 1. At this time, the traveling control block 81 fine-tunes the traveling position of the traveling unit DU so that the delivering side first guide rail 132 respectively enters the first fitting gaps 44 from the rear side in the front-rear direction Y, and reaches the transfer position of the battery unit BU.

In S109, the first delivery management block 151 of the autonomous traveling management system 1 executes the first reception process in the first delivery phase DP1 for the autonomous traveling device 10 whose each delivering side first guide rail 132 has entered each first fitting gap 44. Specifically, the first delivery management block 151 drives the movable conveyor portion 136B of the delivering side first conveyor portion 136 to transport the battery unit BU that was fully charged in the past 107 from the charging station CS to the delivery position. Furthermore, the first delivery management block 151 synchronously drives the movable conveyor portion 132B of each delivering side first guide rail 132 to deliver and couple the battery unit BU to the traveling unit DU in the autonomous traveling device 10.

The second delivery management block 161 of the autonomous traveling management system 1 instructs the autonomous traveling device 10, when the battery unit BU is connected by the first handover process, to pick up the storage transport unit RTU that has undergone the second exchange traveling via the communication systems 110, 5 by S110.

When the autonomous traveling device 10 receives the instruction to pick up the storage transport unit RTU, the traveling control block 81 moves the traveling position of the traveling unit DU away from the delivery position of the battery unit BU in S206 so that each delivering side first guide rail 132 exits each first fitting gap 44. Further, in S206, the traveling control block 81 controls the traveling position of the traveling unit DU to the delivery position of the storage transport unit RTU by each delivering side second guide rail 142 of the autonomous traveling management system 1. At this time, the traveling control block 81 fine-tunes the traveling position of the traveling unit DU so that each delivering side second guide rail 142 enters each second fitting gap 54 from the rear in the front-rear direction Y, and reaches the delivering position of the storage transport unit RTU.

When a negative determination is made in S202 described above, the battery management block 80 of the autonomous traveling device 10 provide a response to the autonomous traveling management system 1 via the communication systems 5, 110, the response indicating whether the battery unit BU is charged (not shown). Therefore, in the autonomous traveling management system 1, when a response indicating that charging is not possible is received, the second delivery management block 161 of S110 instructs the autonomous traveling device 10 whose battery unit BU has been connected, via the communication systems 110, 5 to pick up the storage transport unit RTU that has undergone the second exchange traveling.

When the pick-up instruction corresponding to a response that charging is not possible is received, the traveling control block 81 of the autonomous traveling device 10 moves the traveling position of the traveling unit DU away from the receiving position of the storage transport unit RTU by S206 so that each receiving side second guide rail 141 exits each second fitting gap 54. Further, in S206 in this case, the traveling control block 81 controls the traveling position of the traveling unit DU to the delivery position of the storage transport unit RTU by each delivering side second guide rail 142 of the autonomous traveling management system 1 in the similar manner to the above.

In S111, the second delivery management block 161 of the autonomous traveling management system 1 executes the second delivery process in the second delivery phase DP2 for the autonomous traveling device 10 whose each delivering side second guide rail 142 has entered each second fitting gap 54. Specifically, the second delivery management block 161 drives the movable conveyor portion 146B of the delivering side second conveyor portion 146 to transport the storage transport unit RTU in the package storage state immediately before or in the past S103 from the picking station PS to the delivery position. Further, the second delivery management block 161 synchronously drives the movable conveyor portion 142B of each delivering side second guide rail 142 to deliver and connect the storage transport unit RTU to the battery unit BU on the traveling unit DU in the autonomous traveling device 10.

The traveling control block 81 of the autonomous traveling device 10 whose storage transport unit RTU containing the package 9 is coupled controls the transport traveling of the traveling unit DU so that the package 9 is transported to its scheduled destination and then returned to the management center in S207. From the description so far, as shown in FIG. 1, during the waiting period at the management center before and after the transportation traveling, especially when the determination is positive in S202, the traveling position of the autonomous traveling device 10 is assigned on a traveling route DR for each of these phases of: second reception phase AP2, first reception phase AP1, first delivery phase DP1, and second delivery phase DP2 in this order.

Operation and Effects

The operation effects of the first embodiment will be described below.

In the detachable structure RS of the first embodiment, the power supply structure SS is provided to contactlessly supply power from the battery unit BU to the traveling unit DU through the first fitting gap 44 formed in the coupling area at the first coupling portion RS1. The first coupling portion RS1 detachably connects the battery unit BU to the traveling unit DU by the convex-concave fitting. Therefore, in the first embodiment, the first guide rails 131, 132 that guide the battery unit BU between the traveling unit DU and the charging station CS in the autonomous traveling management system 1 are able to move forward and backward through the first fitting gap 44. According to this, the autonomous traveling management system 1 receives the battery unit BU guided by the receiving side first guide rail 131 from the traveling unit DU as the power supply destination, while transferring the battery unit BU charged at the charging station CS onto the traveling unit DU by the delivering side first guide rail 132. Therefore, the discharged battery unit BU can be replaced with the charged battery unit BU in a timely manner in a short period, and therefore it is possible to improve the efficiency of the replacement.

The locking portion 46A of the detachable structure RS according to the first embodiment locks the battery unit BU, which is one of the detachable convex-concave fitting targets, to the other traveling unit DU from the opposite position in the forward-backward direction of the delivering side first guide rail 132. According to this, when the battery unit BU is transferred by the delivering side first guide rail 132, it can be accurately positioned by being locked by the locking portion 46A so that the battery unit BU is in the posture required for the contactless power supply on the traveling unit DU. Therefore, it is possible to implement efficient replacement of the battery unit BU with high reliability.

In the detachable structure RS according to the first embodiment, the convex portions 41, 42 and concave portions 40, 43 extending in the forward-backward direction of each first guide rail 131, 132 toward the opposite position form the detachable convex-concave fitting at the first coupling portion RS1. According to this, the reception of the battery unit BU from the traveling unit DU by the receiving side first guide rail 131, and the transfer of the battery unit BU onto the traveling unit DU by the delivering side first guide rail 132 can be performed smoothly in the extension direction common to the convex portions 41, 42 and the concave portions 40, 43. Therefore, it is possible to improve the exchange efficiency of the battery units BU.

The first positioning portion PP1 of the detachable structure RS according to the first embodiment positions the battery unit BU, which is one of the convex-concave fitting targets and can be detached by each portion 40 to 43 extending in the front-rear direction Y of the traveling unit DU, with respect to the other traveling unit DU in the front-rear direction Y. According to this, the battery unit BU, which can be smoothly delivered onto the traveling unit DU by the delivering side first guide rail 132, can be positioned in the posture required for contactless power supply on the traveling unit DU and maintained by the first positioning part PP1 even during autonomous traveling. Therefore, it is possible to guarantee appropriate autonomous traveling of the traveling unit DU after efficient replacement of the battery unit BU.

The power supply structure SS according to the first embodiment supplies power contactlessly from the battery unit BU to the traveling unit DU through the electrode portions 47, 48 provided at locations on both sides of the first fitting gap 44 in the battery unit BU and the traveling unit DU. According to this, by providing the electrode portions 47, 48 that can be constructed as small in size as possible on both sides of the first fitting gap 44, it is possible to miniaturize the autonomous traveling device 10 and enable efficient replacement of the battery unit BU.

In the autonomous traveling management system 1 according to the first embodiment, in the first reception phase AP1, the battery unit BU guided by the receiving side first guide rail 131 is received from the traveling unit DU. On the other hand, the battery unit BU charged in the charging phase CP can be delivered onto the traveling unit DU by the delivering side first guide rail 132 in the first delivery phase DP1. Therefore, the battery unit BU discharged by power supply to the traveling unit DU can be timely replaced in a short period with a battery unit BU charged at the charging station CS. Therefore, it is possible to improve the efficiency of the replacement.

In the first reception phase AP1 and the first delivery phase DP1 of the first embodiment, the forward-backward movement of each of the first guide rails 131, 132 into the common first fitting gap 44 is managed. Therefore, in the first embodiment, the traveling positions in each phase are assigned on the travel route DR in the order of the first reception phase AP1 and the first delivery phase DP1. According to this, after the battery unit BU is received from the traveling unit DU by the receiving side first guide rail 131, the battery unit BU can be smoothly delivered to the traveling unit DU by the delivering side first guide rail 132, which is separate from the reception, along the traveling route DR. Therefore, it is possible to improve the exchange efficiency of the battery units BU.

In the detachable structure RS according to the first embodiment, the second fitting gap 54 is formed at the second coupling portion RS2 where the storage transport unit RTU is detachably connected to the battery unit BU connected to the traveling unit DU by a convex-concave fitting. Therefore, in the second fitting gap 54 in the first embodiment, second guide rails 141, 142 that guide the storage transport unit RTU between the battery unit BU and the picking station PS in the autonomous traveling management system 1 are able to move forward and backward. According to this, the autonomous traveling management system 1 receives the storage transport unit RTU guided by the receiving side second guide rail 141 from the battery unit BU connected to the traveling unit DU, while transferring the storage transport unit RTU that has stored package 9 at the picking station PS onto the battery unit BU via the delivering side second guide rail 142. Therefore, after transporting the package 9, the storage transport unit RTU can be replaced with the storage transport unit RTU in which the package 9 is stored in a timely manner in a short period. Therefore, it is possible to improve the replacement efficiency.

The locking portion 56A of the detachable structure RS according to the first embodiment locks the storage transport unit RTU, which is one of the detachable convex-concave fitting targets, to the other battery unit BU from the opposite position in the forward-backward direction of the delivering side second guide rail 142. According to this, when the storage transport unit RTU is delivered by the delivering side second guide rail 142, it can be accurately positioned by being locked with the locking portion 56A so that it is in a posture suitable for transporting the package on the battery unit BU. Therefore, it is possible to implement the efficient replacement of the storage transport unit RTU with high reliability.

In the detachable structure RS according to the first embodiment, the convex portions 51, 52 and concave portions 50, 53 extending from the advancing-retreating side position of each second guide rail 141, 142 toward the opposite position form the detachable convex-concave fitting at the second coupling portion RS2. According to this, the receiving side second guide rail 141 can smoothly receive the storage transport unit RTU from the battery unit BU, and the delivering side second guide rail 142 can smoothly transfer the storage transport unit RTU onto the battery unit BU in the extension direction common to the convex portions 51, 52 and the concave portions 50, 53. Therefore, it is possible to improve the efficiency of replacing the storage transport unit RTU.

The second positioning portion PP2 of the detachable structure RS in the first embodiment positions the storage transport unit RTU, which is one of the convex-concave fitting targets and can be detached by each portion 50 to 53 extending in the front-rear direction Y of the traveling unit DU, with respect to the other battery unit BU in the front-rear direction Y. According to this, the delivering side transport unit RTU that has been smoothly delivered onto the battery unit BU by the delivering side second guide rail 142 is positioned in the posture suitable for transporting the package on the battery unit BU. In this state, the second positioning portion PP2 can hold the vehicle in place even during autonomous traveling. Therefore, it is possible to guarantee appropriate package transportation after efficient replacement of the storage transport unit RTU.

In the autonomous traveling management system 1 according to the first embodiment, in the second reception phase AP2, the battery unit BU guided by the receiving side second guide rail 141 is received from the battery unit BU coupled to the traveling unit DU. On the other hand, the storage transport unit RTU that has stored the package 9 in the storage phase RP can be delivered onto the battery unit BU by the delivering side second guide rail 142 in the second delivery phase DP2. Therefore, after transporting the package 9, the storage transport unit RTU can be replaced in a timely manner in a short period at the picking station PS with the storage transport unit RTU in which the package 9 is stored. Therefore, it is possible to improve the replacement efficiency.

In the second reception phase AP2 and the second delivery phase DP2 of the first embodiment, the forward-backward movement of each of the separate second guide rails 141, 142 into the common second fitting gap 54 is managed. Therefore, in the first embodiment, the traveling positions in each phase are assigned on the travel route DR in the order of the second reception phase AP2, the first reception phase AP1, the first delivery phase DP1, and the second delivery phase DP2. According to this, the receiving side second and first guide rails 141, 131 sequentially receive the storage transport unit RTU and the battery unit BU from the traveling unit DU. Thereafter, the sequential delivery, which is different from the above separate from the sequential reception, of the battery units BU and the storage transport unit RTU onto the traveling unit DU can be smoothly performed along the traveling route DR by the delivering side first and second guide rails 132, 142. Therefore, it is possible to improve the exchange efficiency of both the battery unit BU and the storage transport unit RTU.

Second Embodiment

A second embodiment is a modification of the first embodiment.

Figure 16:
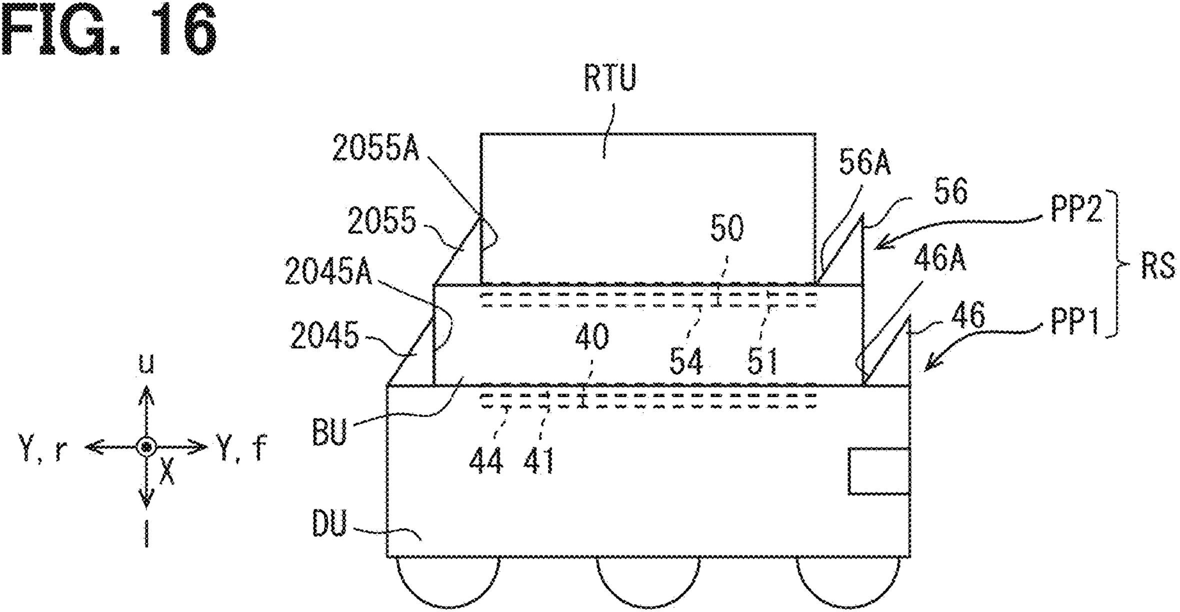
FIG. 16 is a side view showing the autonomous traveling device according to a second embodiment.

As shown in FIG. 16, in the first positioning portion PP1 of the second embodiment, a locking portion 2045A of a rear positioning claws 2045 provided on the traveling unit DU is formed in a vertical plane extending in the upper-lower direction and the lateral direction X. As a result, the locking portion 2045A of the rear positioning claw 2045 is capable of locking and positioning the battery unit BU from the rear in the front-rear direction Y with their entire planar surfaces.

The locking portion 2045A of each rear positioning claw 2045 can lock the battery unit BU, when it is received through the receiving side first guide rail 131, by its flat upper end from the opposite to the front in the front-rear direction where the rail 131 moves forward and backward with respect to the traveling unit DU. Further, the locking portion 2045A of each rear positioning claw 2045 is capable of being locked with the flat upper end of the battery unit BU when it is delivered through the delivering side first guide rail 132 from the opposite to the front in the direction where the rail 132 moves forward and backward with respect to the traveling unit DU. Therefore, in S205 of the management flow, the traveling unit DU is controlled to perform a point turn of, for example, 180 degrees on the traveling route DR, and then the traveling position is finely adjusted to the delivery position of the battery unit BU.

In this way, the locking portion 2045A of the detachable structure RS according to the second embodiment locks the battery unit BU, which is one of the detachable convex-concave fitting targets, to the other traveling unit DU from the opposite to the advancing-retreating position of the delivering side first guide rail 132. According to this, when the battery unit BU is transferred by the delivering side first guide rail 132, it can be accurately positioned by being locked by the locking portion 2045A so that the battery unit BU is in the posture required for the contactless power supply on the traveling unit DU. Therefore, it is possible to implement efficient replacement of the battery units BU with high reliability.

As shown in FIG. 16, in the second positioning portion PP2 of the second embodiment, a locking portion 2055A of a rear positioning claw 2055 provided on the traveling unit DU are formed in a vertical plane extending in the upper-lower direction and the lateral direction X. As a result, the locking portions 2055A of the rear positioning claws 2055 are capable of locking and positioning the storage transport unit RTU from the rear in the front-rear direction Y with their entire planar surfaces.

The locking portion 2055A of each rear positioning claw 2055 is capable of locking the storage transport unit RTU, when it is received through the receiving side second guide rail 141, with its flat upper end from the opposite to the front in the direction where the rail 141 moves forward and backward with respect to the traveling unit DU. Further, the locking portion 2055A of each rear positioning claw 2055 is capable of being locked with the flat upper end of the storage transport unit RTU when it is delivered through the delivering side second guide rail 142 from the opposite to the front in the direction where the rail 142 moves forward and backward with respect to the traveling unit DU. Therefore, in S206 of the management flow, the traveling unit DU is controlled to perform a point turning drive of, for example, 180 degrees on the traveling route DR, and then the traveling position is finely adjusted to the delivery position of the storage transport unit RTU.

In such a manner, the locking portion 2055A of the detachable structure RS according to the second embodiment locks the storage transport unit RTU, which is one of the detachable convex-concave fitting targets, to the other battery unit BU from the opposite position in the forward-backward direction of the delivering side second guide rail 142. According to this, when the storage transport unit RTU is delivered by the delivering side second guide rail 142, it can be accurately positioned by being locked with the locking portion 2055A so that it is in a posture suitable for transporting the package on the battery unit BU. Therefore, it is possible to implement the efficient replacement of the storage transport unit RTU with high reliability.

Figure 17:
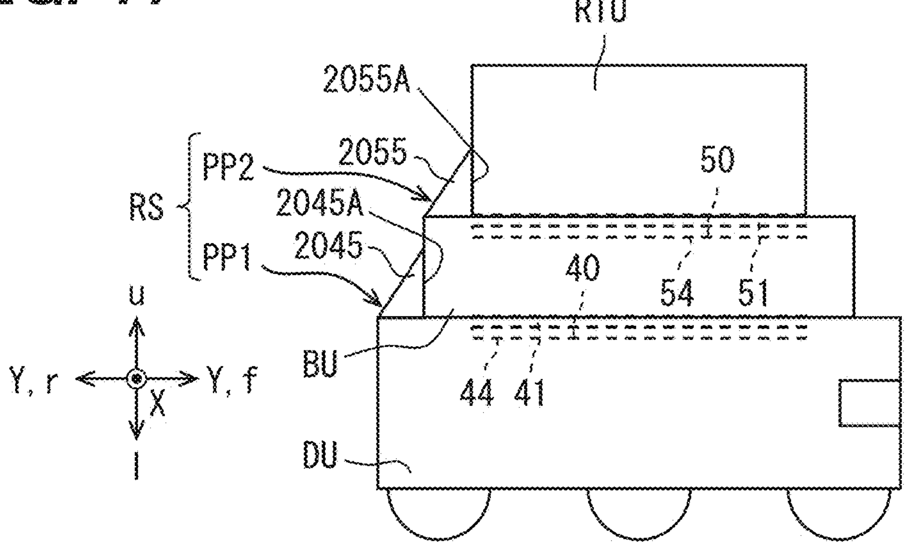
FIG. 17 is a side view showing the autonomous traveling device according to a modification of the second embodiment.
Figure 18:
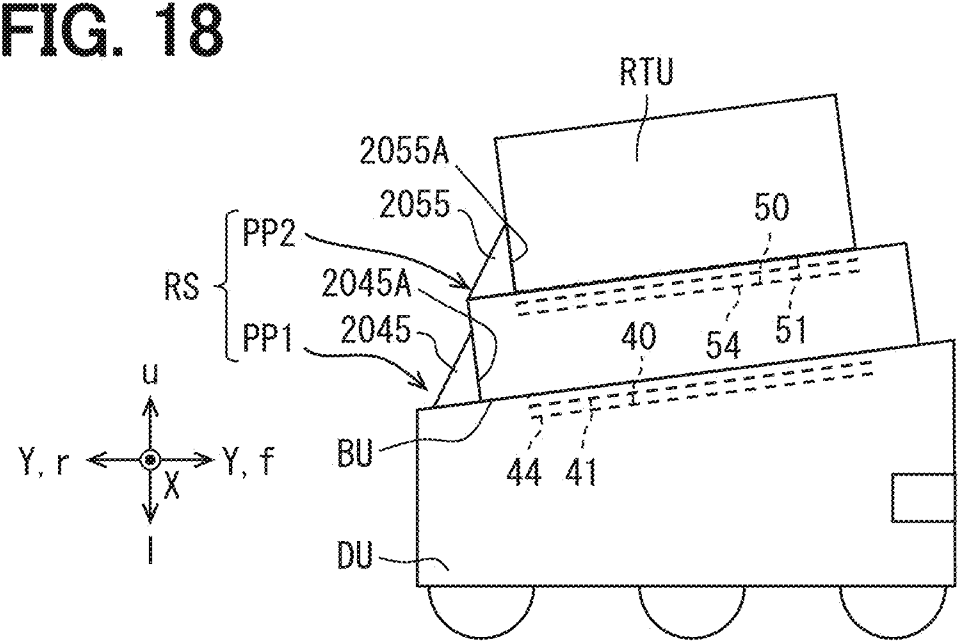
FIG. 18 is a side view showing the autonomous traveling device according to a modification of the second embodiment.

As shown in FIG. 17, in a modification of the second embodiment, the multiple front positioning claws 46 may be omitted from the first positioning portion PP1. In this case, as shown in FIG. 18, the battery unit BU that is aligned in the lateral direction X on the traveling unit DU but tilted with respect to the front-to-rear direction Y may be locked by the locking portions 2045A of each rear positioning claw 2045. In FIG. 18, the extending directions of the concave portions 40, 43 and the convex portions 41, 42 are also inclined with respect to the front-rear direction Y in accordance with the inclined posture of the battery unit BU. However, the extension directions of the concave portions 40, 43 and the convex portions 41, 42 may substantially coincide with the front-rear direction Y regardless of the inclined posture of the battery unit BU.

As shown in FIG. 17, in a modification of the second embodiment, the multiple front positioning claws 56 may be omitted from the second positioning portion PP2. In this case, as shown in FIG. 18, the storage transport unit RTU is aligned in the lateral direction X on the traveling unit DU and the battery unit BU but is inclined with respect to the front-to-rear direction Y. The locking portion 2055A of each rear positioning claw 2055 may lock the storage transport unit RTU. In FIG. 18, the extension directions of the concave portions 50 and 53 and the convex portions 51 and 52 are also inclined with respect to the front-rear direction Y in accordance with the inclined posture of the storage transport unit RTU. However, the extension directions of the concave portions 50, 53 and the convex portions 51, 52 may substantially coincide with the front-rear direction Y regardless of the inclined posture of the storage transport unit RTU.

In the modification of the second embodiment, the rear positioning claw 45 of the first embodiment is provided in place of the rear positioning claw 2045 in the first positioning portion PP1, so that only the rear positioning claw 2055 of the second positioning portion PP2 may be adopted. In the modification of the second embodiment, the rear positioning claw 55 of the first embodiment is provided in place of the rear positioning claw 2055 at the second positioning portion PP2, so that only the rear positioning claw 2045 of the first positioning portion PP1 may be adopted.

In the modification of the first and second embodiments, the positioning claws 45, 46, 2045 may be omitted from the first positioning portion PP1. In the modification of the first and second embodiments, instead of the positioning claws 45, 46, 2045 at the first positioning portion PP1, positioning in the front-rear direction Y may be achieved by an easily detachable fitting structure between a hemispherical protrusion and a conical or tapered hole provided on one side of the unit DU, the other side of the unit BU, respectively. In the modification of the first and second embodiments, positioning in the front-rear direction Y may be achieved by a detachable fitting structure between an electromagnetically driven protrusion provided on the battery unit BU and a hole provided on the traveling unit DU, instead of the positioning claws 45, 46, 2045 at the first positioning portion PP1.

In the modification of the first and second embodiments, the positioning claws 55, 56, 2055 may be omitted from the second positioning portion PP2. In the modification of the first and second embodiments, instead of the positioning claws 55, 56, 2055 at the second positioning portion PP2, positioning in the front-rear direction Y may be achieved by an easily detachable fitting structure between a hemispherical protrusion and a conical or tapered hole provided on one side of the unit BU, the other side of the unit RTU, respectively. In the modification of the first and second embodiments, positioning in the front-rear direction Y may be achieved by a detachable fitting structure between an electromagnetically driven protrusion provided on the battery unit BU and a hole provided on the storage transport unit RTU, instead of the positioning claws 55, 56, 2055 at the second positioning portion PP2.

Third Embodiment

A third embodiment is another modification of the first embodiment.

Figure 19:
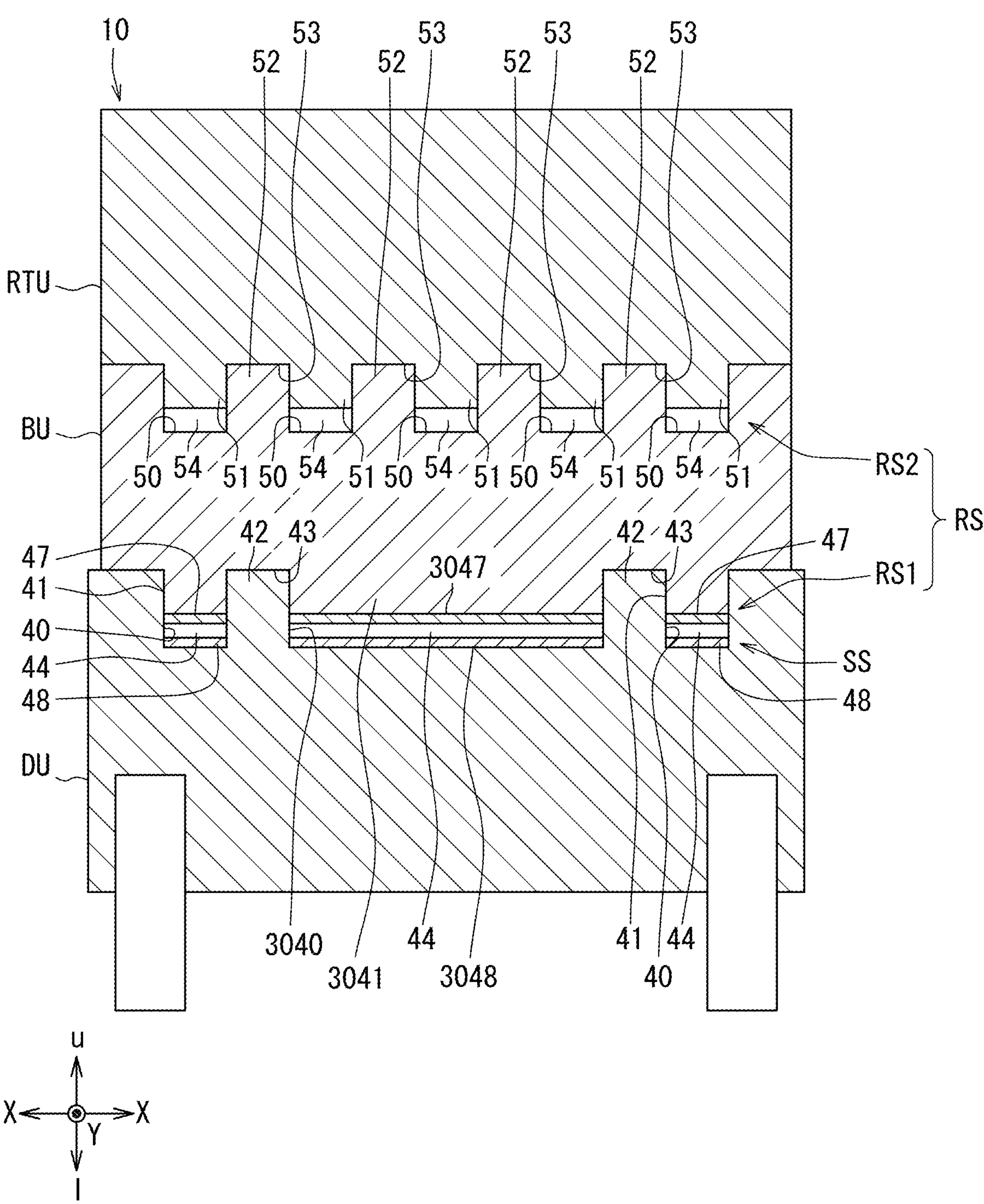
FIG. 19 is a vertical cross-sectional view showing the autonomous traveling device according to a third embodiment.

As shown in FIG. 19, in a vertical cross section of the third embodiment taken along the horizontal direction X in the coupled state of the units DU and BU, the widths of rectangular concave portions 40 and 3040 are different from each other. Accordingly, the widths of rectangular convex portions 41 and 3041 are different from each other. Specifically, the width of the concave portion 3040 located at the center in the lateral direction X is set to be larger than the width of the concave portions 40 located on both sides thereof. Similarly, the width of the convex portion 3041 located at the center in the lateral direction X is set to be larger than the width of the convex portions 41 located on both sides thereof.

In the power supply structure SS of the third embodiment, an electrode portion 3047 in the battery unit BU and an electrode portion 3048 in the traveling unit DU are each provided on either side of the first fitting gap 44 at the center position in the lateral direction X in the connected state of the units BU and DU, i.e., in a pair of a convex rib portion 3041 and a concave portion 3040. In other words, the electrode portion 3047 and the electrode portion 3048 sandwich the first fitting gap 44. As a result, in the third embodiment, the facing areas of the electrode portions 3047, 3048 in the battery unit BU and the traveling unit DU face the first fitting gap 44, and are secured as large as possible. It is possible to increase the power supply.

Fourth Embodiment

A fourth embodiment is still another modification of the first embodiment.

Figure 20:
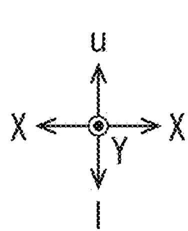
FIG. 20 is a vertical cross-sectional view showing the autonomous traveling device according to a fourth embodiment.
Figure 20:
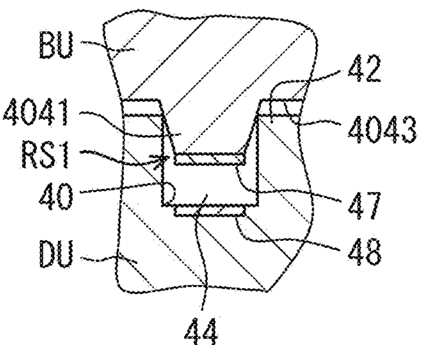

As shown in FIG. 20, in the first coupling portion RS1 of the fourth embodiment, multiple convex portions 4041 provided in the battery unit BU are common to a trapezoidal shape whose width in the lateral direction X narrows toward the lower. Therefore, each convex portion 4041 is capable of fitting in a wedge-like convex-concave fitting manner with the upper end of the corresponding concave portion 40 in the traveling unit DU, i.e., with the edges of the convex portions 42 on both sides of the corresponding concave portion 40 in the lateral direction X.

In the fourth embodiment, this wedge-like convex-concave fitting makes it possible to reduce positional deviation in the lateral direction X of the battery unit BU with respect to the traveling unit DU. In addition, in the fourth embodiment, the wedge-like convex-concave fitting makes it possible for each first fitting gap 44 to maintain a space of a set size surrounded by the top surface of the convex portion 4041 and the inner surface of the concave portion 40 regardless of repeated attachment and detachment. Furthermore, the bottom surfaces of multiple trapezoidal concave portions 4043 provided in the battery unit BU at the first coupling portion RS1 are configured to face the top surfaces of the corresponding convex portion 42 in the traveling unit DU with clearances in the upper-lower direction.

Figure 21:
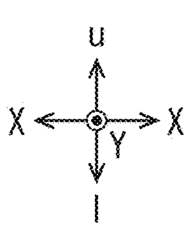
FIG. 21 is a vertical cross-sectional view showing the autonomous traveling device according to the fourth embodiment.
Figure 21:
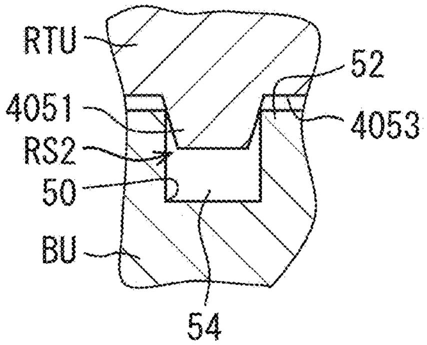

As shown in FIG. 21, multiple convex portions 4051 are provided on the storage transport unit RTU at the second coupling portion RS2 of the fourth embodiment, and are common to a trapezoidal shape whose width in the lateral direction X narrows toward the bottom in the connected state of the units BU and RTU on the traveling unit DU. Therefore, each convex portion 4051 is capable of being, in the wedge-like manner, fitted into the upper end of the corresponding concave portion 50 in the battery unit BU on the traveling unit DU, i.e., into the edges of the convex portions 52 placed on both sides of the corresponding concave portion 50 in the lateral direction X.

In the fourth embodiment, this convex-concave fitting in the wedge-like manner makes it possible to reduce the positional deviation in the lateral direction X of the storage transport unit RTU with respect to the battery unit BU on the traveling unit DU. In addition, in the fourth embodiment, the wedge-like convex-concave fitting makes it possible for each second fitting gap 54 to maintain a space of a set size surrounded by the top surface of the convex portion 4051 and the inner surface of the concave portion 50 regardless of repeated attachment and detachment. Furthermore, the bottom surfaces of multiple trapezoidal concave portions 4053 provided in the storage transport unit RTU at the second coupling portion RS2 are configured to face the top surfaces of the corresponding convex portions 52 in the battery unit BU on the traveling unit DU with clearances in the upper-lower direction.

Figure 22:
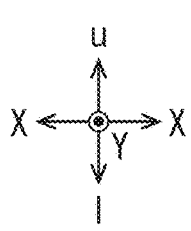
FIG. 22 is a vertical cross-sectional view showing the autonomous traveling device according to a modification of the fourth embodiment.
Figure 22:
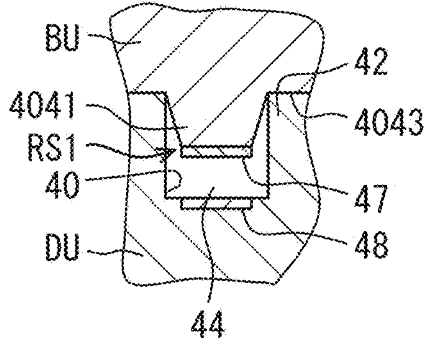
Figure 23:
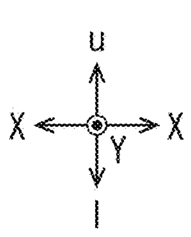
FIG. 23 is a vertical cross-sectional view showing the autonomous traveling device according to a modification of the fourth embodiment.
Figure 23:
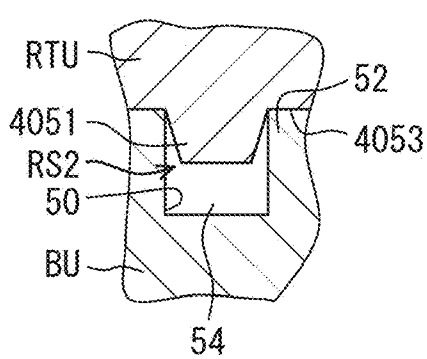

As shown in FIG. 22, in a modification of the fourth embodiment, the bottom of the convex portion 4041 is fitted by the upper end of the concave portion 40, i.e., the edges of the convex portion 42. The top surface of the convex portion 42 and the bottom surface of the concave portion 4043 may be in contact with each other in the upper-lower direction. Similarly, as shown in FIG. 23, in the modification of the fourth embodiment, the bottom of the convex portion 4051 is fitted in the upper end of the concave portion 50, i.e., the edges of the convex portion 52. The top surface of the convex portion 52 and the bottom surface of the concave portion 4053 may be in contact with each other in the upper-lower direction.

In the modification of the fourth embodiment, the convex portion 41 of the first embodiment is provided in place of the convex portion 4041 at the first coupling portion RS1, so that only the convex portion 4051 of the second coupling portion RS2 may be adopted. In the modification of the fourth embodiment, the convex portion 51 of the first embodiment is provided in place of the convex portion 4051 at the second coupling portion RS2, so that only the convex portion 4041 of the first coupling portion RS1 may be adopted.

Fifth Embodiment

A fifth embodiment is a modification of the first embodiment.

Figure 24:
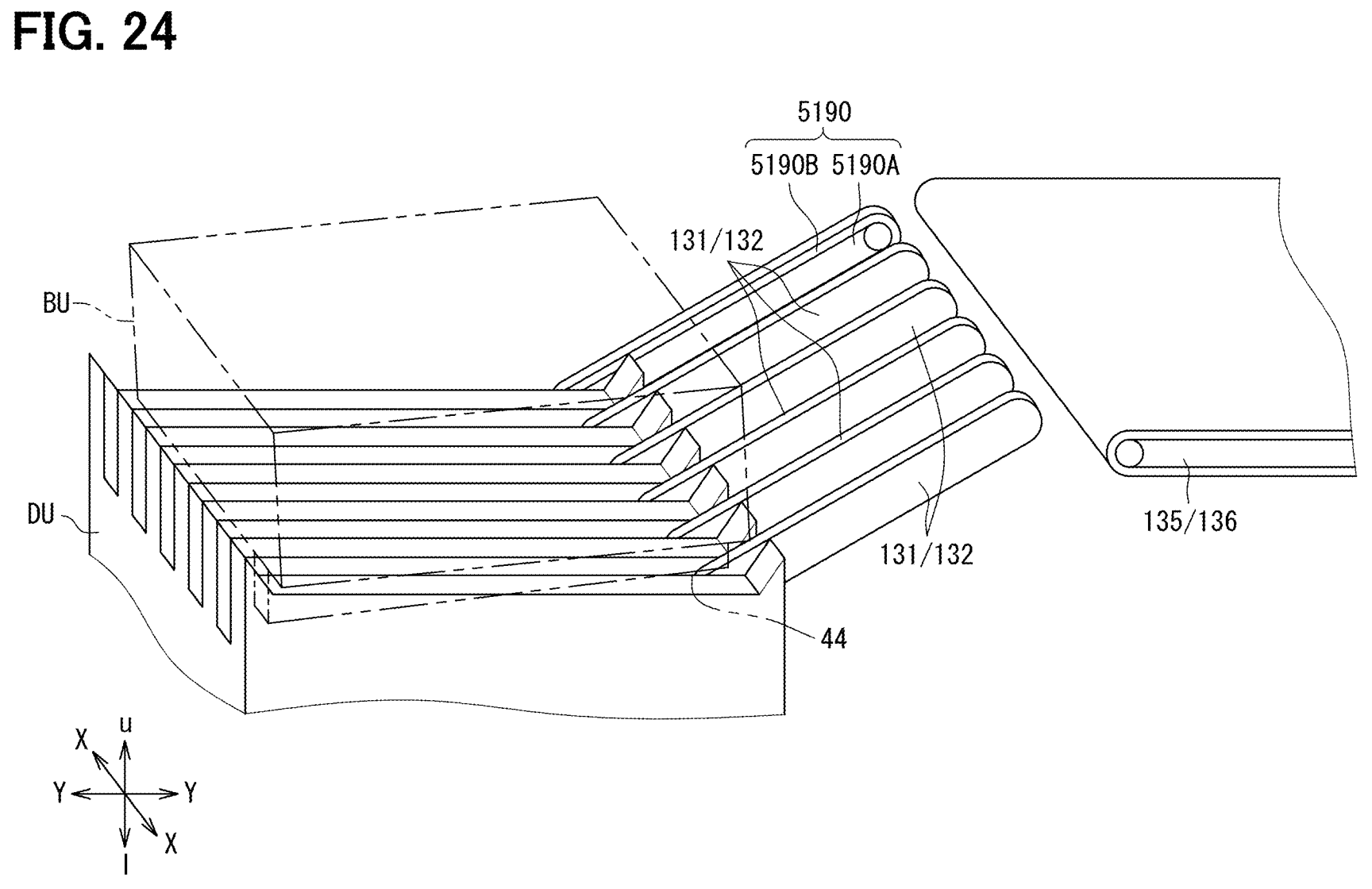
Figure 25:
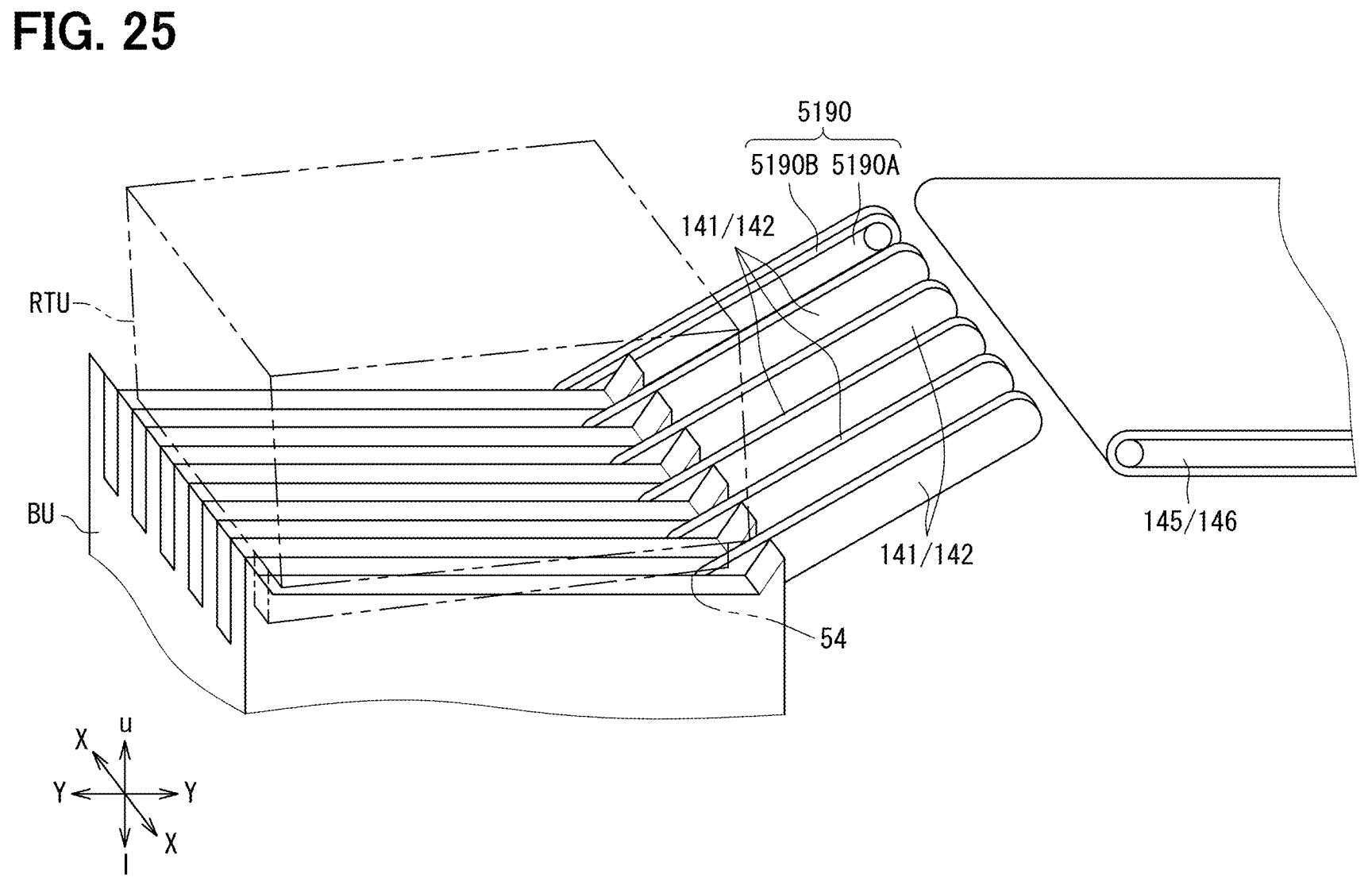
Figure 26:
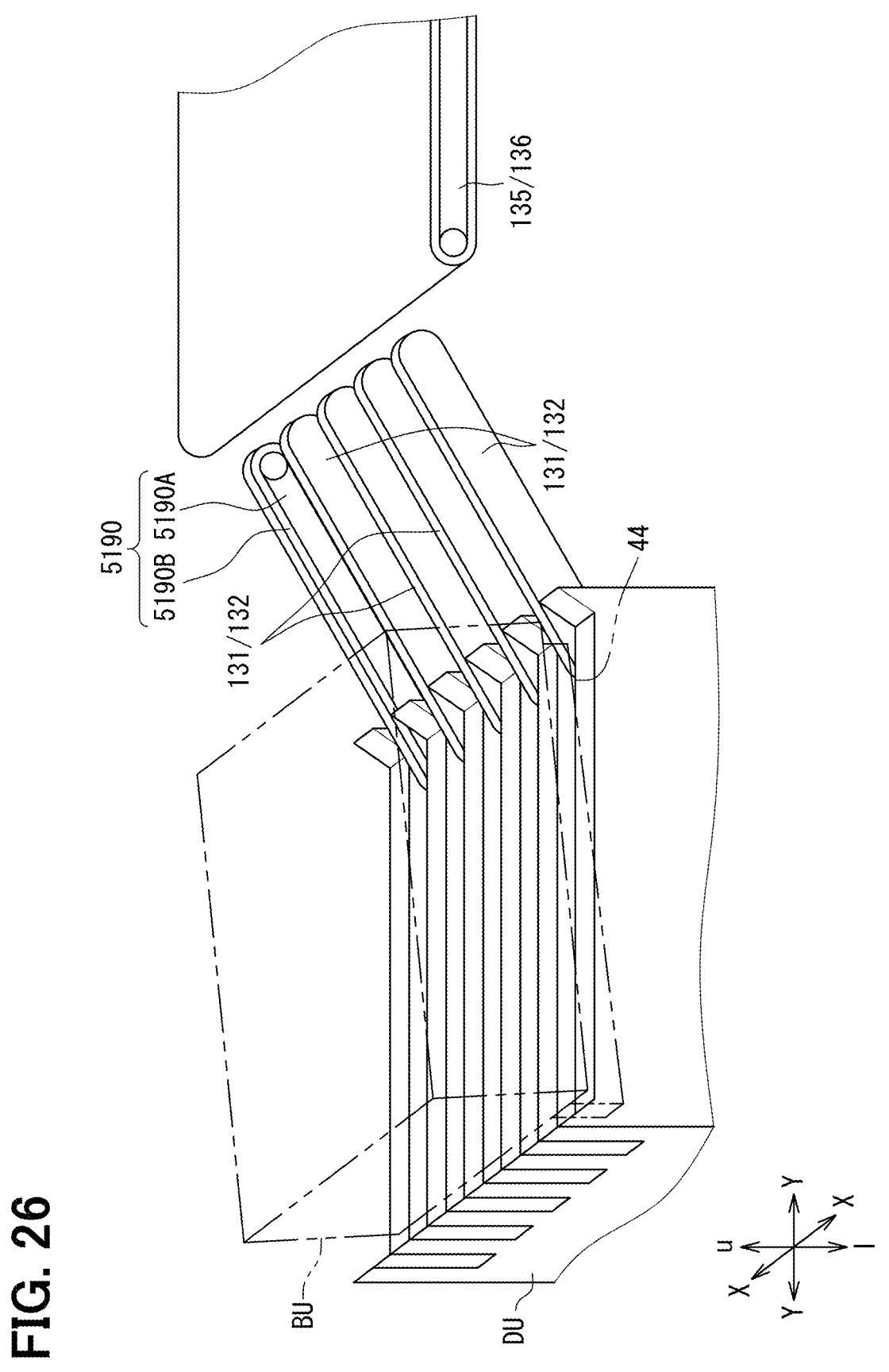

As shown in FIGS. 24 and 25, in the fifth embodiment, the movable conveyor portions 131B, 132B, 141B, and 142B are not provided for the guide rail 131, 132, 141, and 142, but instead an auxiliary guide rail 5190 is added to support each guide rail 131, 132, 141, and 142. The auxiliary guide rail 5190 is placed on one side in the lateral direction X where the corresponding guide rails 131, 132, 141, and 142 are aligned, in an inclined position similar to that of the corresponding rails. In the auxiliary guide rail 5190, a movable conveyor portion 5190B supported by a fixed rail unit 5190A is driven. As a result, the guidance of the battery unit BU or the storage transport unit RTU by the corresponding multiple guide rails 131, 132, 141, 142 can be implemented with a relatively simple configuration. Such an auxiliary guide rail 5190 may be removed from the target of advancement/retraction with respect to the fitting gaps 44, 54 as shown in FIG. 24 (in the example for the fitting gap 44), or may be set as the target of advancement/retraction as shown in a modification in FIG. 26 (in the example for the fitting gap 44).

Figure 27:
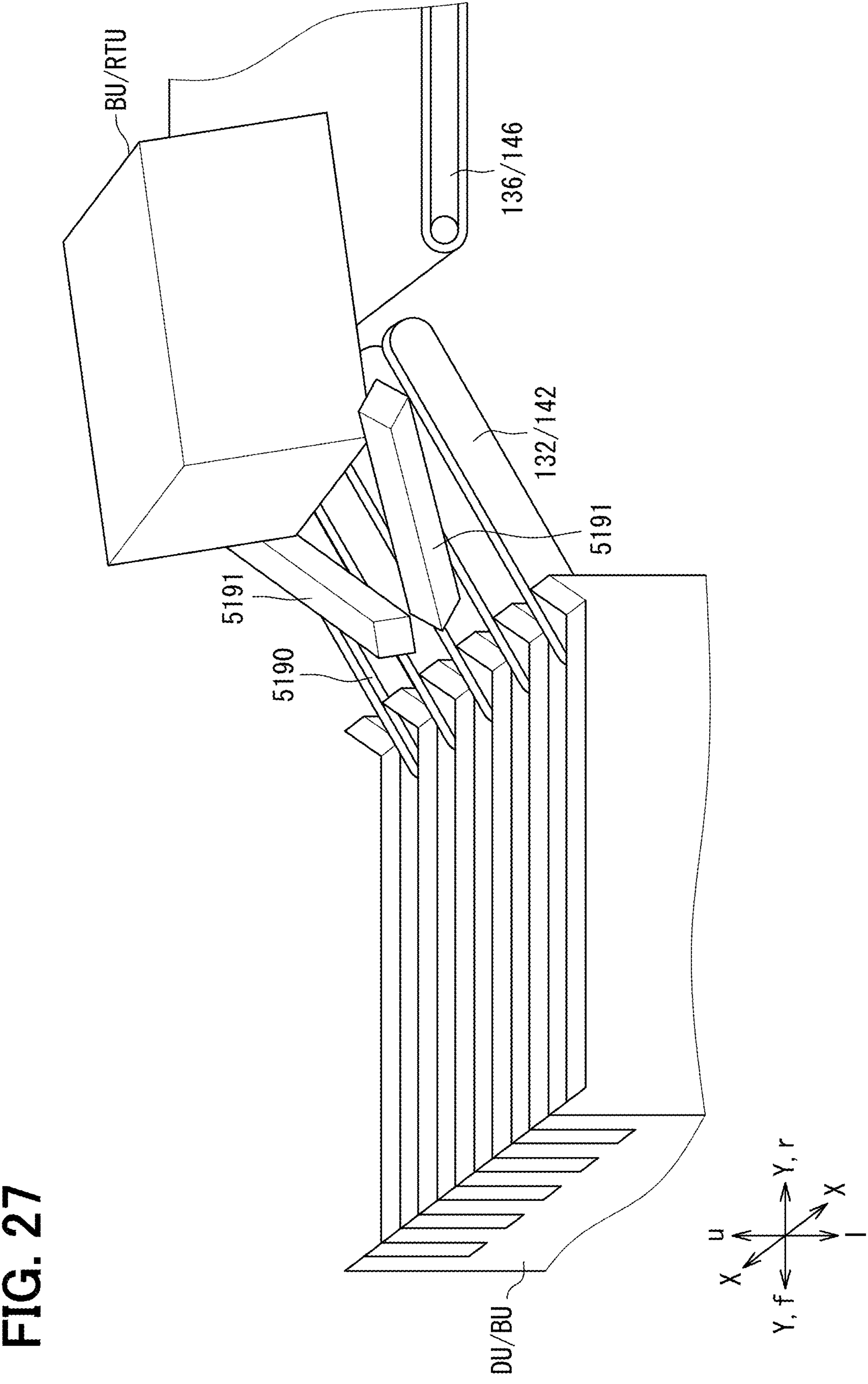
FIG. 27 is a perspective view showing the autonomous traveling management system and the autonomous traveling device according to a modification of the fifth embodiment.

In addition, in a modification of the sixth embodiment as shown in FIG. 27, a drive gate 5191 may be added on the multiple delivering side guide rails 132, 142 and on the auxiliary guide rail 5190 to be moved forward or backward, in order to control the transport speed due to gravity of the battery unit BU or storage transport unit RTU to be guided. Specifically, the drive gate 5191 may have a pair of gate bars arranged in a generally V-shape that tapers downward, and the angle between the gate bars may be gradually reduced as the object to be guided is transported. This enables the drive gate 5191 to safely deliver the object to be guided, with its transport speed controlled, between the gate bars to the autonomous traveling device 10.

Sixth Embodiment

A sixth embodiment is a modification of the fifth embodiment.

Figure 28:
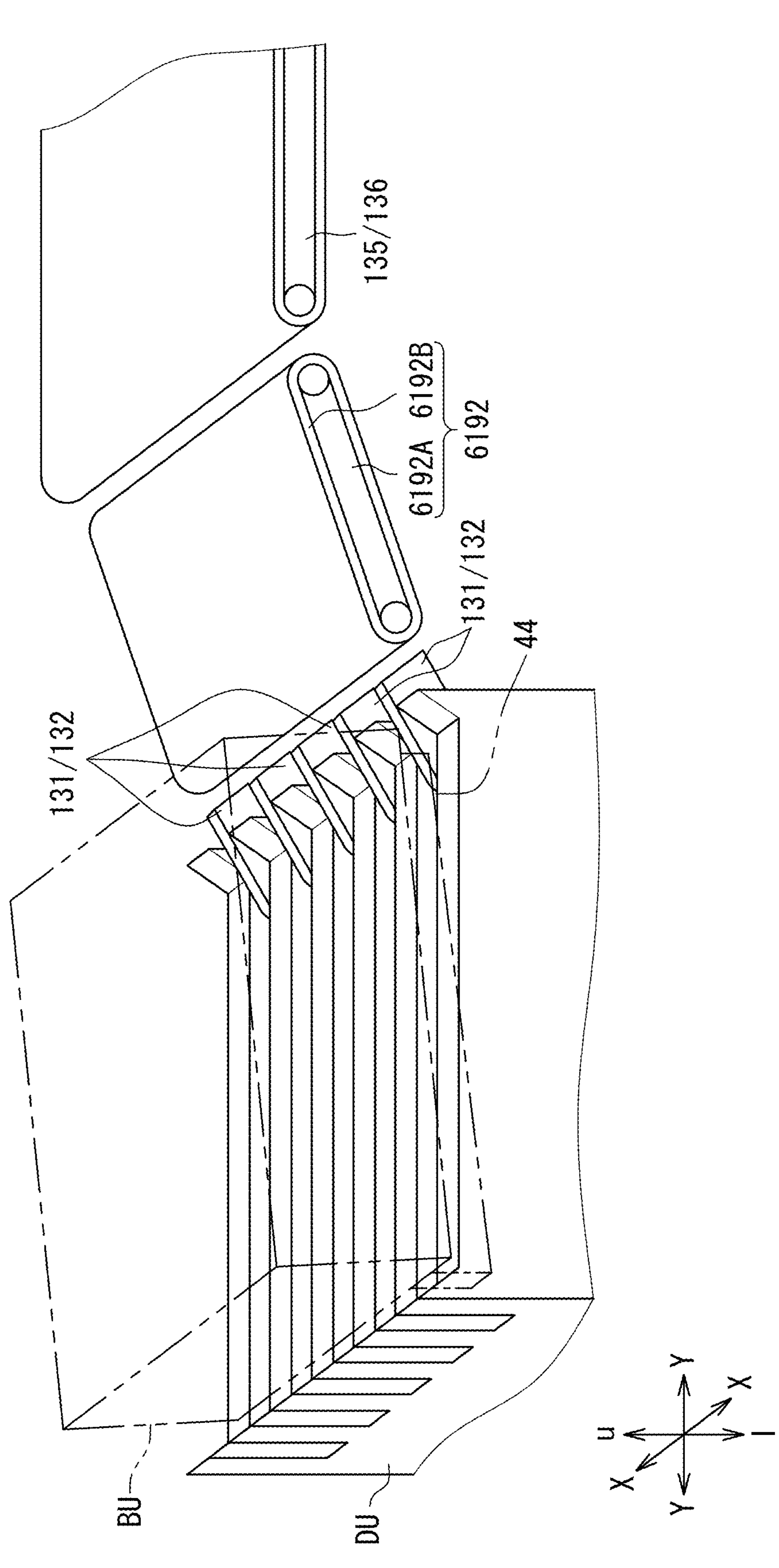
FIG. 28 is a perspective view showing the autonomous traveling management system and the autonomous traveling device according to a sixth embodiment.
Figure 29:
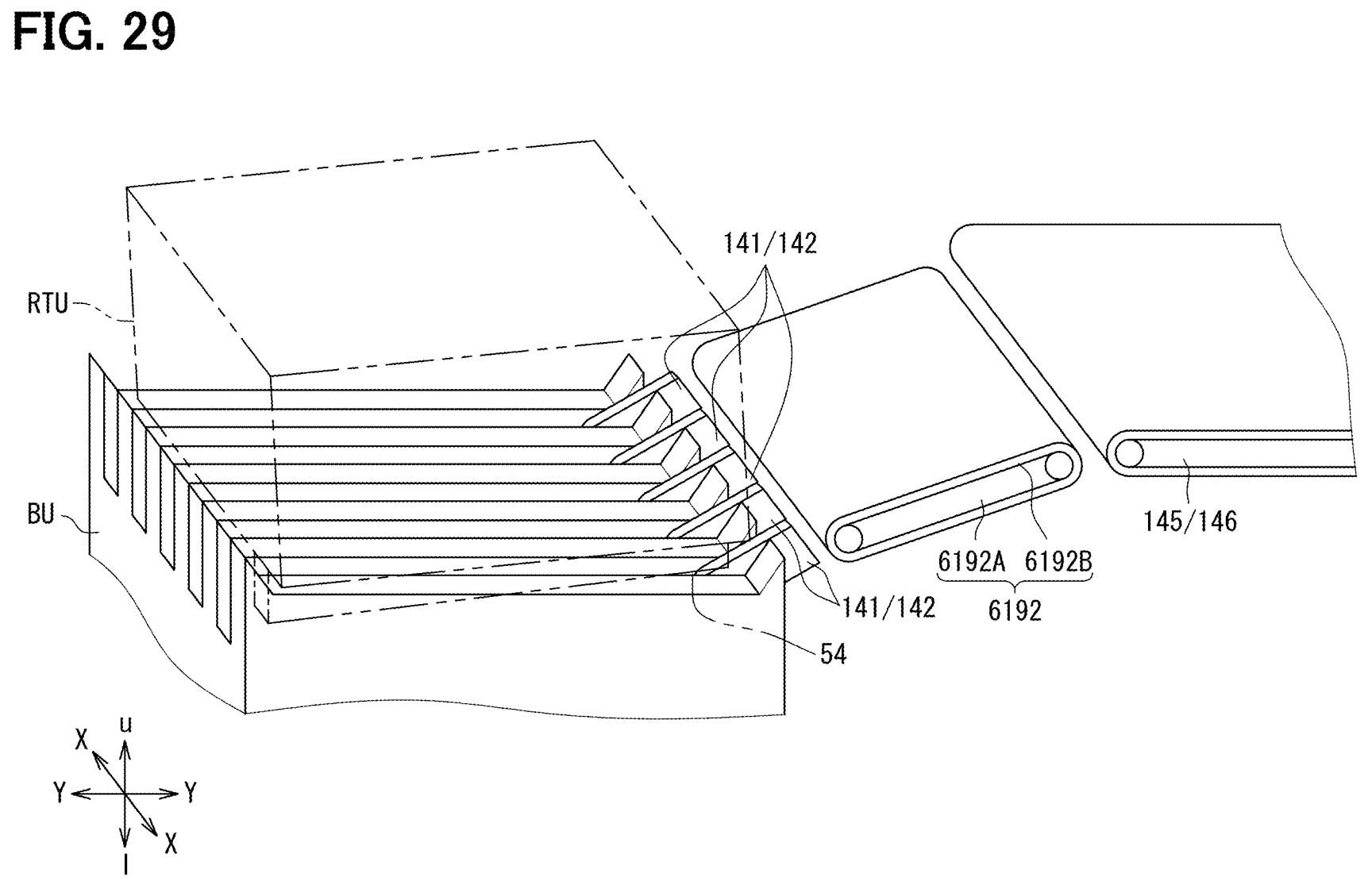

As shown in FIGS. 28 and 29, in the sixth embodiment, an auxiliary conveyor portion 6192 is added in place of the auxiliary guide rail 5190 as an element to assist each guide rail 131, 132, 141, 142 that is not provided with the movable conveyor portions 131B, 132B, 141B, 142B. The auxiliary conveyor portion 6192 connects between the corresponding guide rails 131, 132, 141, 142 and the conveyor portions 135, 136, 145, 146 in the inclined position similar to that of the corresponding rails. In the auxiliary conveyor portion 6192, a movable conveyor portion 6192B supported by a fixed rail portion 6192A is driven. As a result, the guidance of the battery unit BU or the storage transport unit RTU by the corresponding multiple guide rails 131, 132, 141, 142 can be implemented with a relatively simple configuration.

Other Embodiment

Although multiple embodiments have been described above, the present disclosure is not construed as being limited to those embodiments, and can be applied to various embodiments and combinations within a scope that does not depart from the spirit of the present disclosure.

In the modifications of the first to sixth embodiments, the control unit CU and/or the dedicated computer constituting the processing device 120 may have at least one of a digital circuit and an analog circuit as a processor. The digital circuit is at least one type of, for example, an application specific integrated circuit (i.e., ASIC), a field programmable gate array (i.e., FPGA), a system on a chip (i.e., SOC), a programmable gate array (i.e., PGA), a complex programmable logic device (i.e., CPLD), and the like. Such a digital circuit may also include a memory in which a program is stored.

In the modifications of the first to sixth embodiments, the convex-concave fitting of the first coupling portion RS1 may be formed from the convex portions 41, 3041, 4041 and the concave portions 43, 4043 provided on the traveling unit DU and the concave portions 40, 3040 and the convex portion 42 provided on the battery unit BU. In the modifications of the first to sixth embodiments, the convex-concave fitting of the second coupling portion RS2 may be constructed from convex portions 51, 3051, 4051 and the concave portion 53, 4053 provided on the traveling unit DU and concave portions 50, 3050 and the convex portion 52 provided on the battery unit BU.

In the modifications of the first to sixth embodiments, the extension direction common to the concave portions 40, 43, 3040, 4043 and the convex portions 41, 42, 3041, 4041 may be substantially consistent with the lateral direction X, which is the direction from the advancing-retreating position of the guide rails 131, 132 between the units DU and BU to the opposite position. In the modifications of the first to sixth embodiments, the extension direction common to the concave portions 50, 53, 3050, 4053 and the convex portions 51, 52, 3051, 4051 may substantially coincide with the lateral direction X, which is the direction from the advancing-retreating position of the guide rails 141, 142 between the units BU and RTU to the opposite position.

In the modifications of the first to sixth embodiments, in addition to the power supply structure SS that implements contactless power supply using an electric field coupling method, the power supply structure SS that implements the contactless power supply using, for example, an electromagnetic coupling method or a magnetic field resonance method may be adopted. In the modifications of the first to sixth embodiments, in addition to the traveling unit DU that turns by utilizing the rotational difference between each drive wheel 3Ad, for example, a traveling unit DU that turns by steering the wheels 3A, like an automobile, may be used.

In the modifications of the first to sixth embodiments, the autonomous traveling device 10 may be applied to the management of an autonomous traveling device 10 that is not intended to transport the package 9 using the storage transport unit RTU, or an autonomous traveling device 10 in which the storage transport unit RTU is integrated into the battery unit BU. In this case, at least the configuration of the picking subsystem 140 and the processes in phases AP2 and DP2 relating to the receipt and delivery of the storage transport unit RTU may be omitted. However, in the autonomous traveling device 10 in which the storage transport unit RTU is integrated into the battery unit BU, the charging subsystem 130 may also function as the picking subsystem 140, so that the charging station CS may perform the function of the picking station PS.

In the modifications of the first to sixth embodiments, the common first guide rail 131 may be adopted as the target for moving forward and backward with respect to the fitting gap 44 in the first reception phase AP1 and the first delivery phase DP1 related to the battery unit BU. In the modifications of the first to sixth embodiments, the common second guide rail 141 may be used as the target for moving forward and backward with respect to the fitting gap 54 in the second reception phase AP2 and the second delivery phase DP2 related to the storage transport unit RTU. In the modifications of the first to sixth embodiments, the storage transport unit RTU containing the package 9 stored in the storage transport unit RTU may be handed over to the autonomous traveling management system 1 for the purpose of recovering the package at the picking station PS.

What is claimed is:

1. An autonomous traveling device that autonomously travels in a charged state after being charged at a charging station of an autonomous traveling management system, the autonomous traveling device comprising:
- a traveling unit that receives power for autonomous traveling;
- a battery unit capable of supplying the power to the traveling unit in the charged state and in a coupled state where the battery unit is coupled to the traveling unit;
- a detachable structure that
  - is a structure for detachably connecting the battery unit to the traveling unit by convex-concave fitting,
  - forms, at a coupling area, a fitting gap through which a guide rail that guides the battery unit between the traveling unit and the charging station in the autonomous traveling management system moves forward and backward; and
- a power supply structure for contactlessly supplying the power from the battery unit to the traveling unit through the fitting gap.

2. The autonomous traveling device according to claim 1, further comprising:
- a storage transport unit that transports a package in a storage state where the package is stored at a picking station of the autonomous traveling management system and in a coupled state where the package is coupled onto the battery unit, wherein
- the detachable structure includes:
  - a first coupling portion that
    - is a coupling portion that detachably couples the battery unit to the traveling unit by the convex-concave fitting, and
    - forms, at the coupling area, a first fitting gap that is the fitting gap through which a first guide rail as the guide rail moves forward and backward; and
  - a second coupling portion that
    - is a coupling portion that detachably couples the storage transport unit to the battery unit coupled to the traveling unit by the convex-concave fitting, and
    - forms, at the coupling area, a second fitting gap that is the fitting gap through which a second guide rail that guides the storage transport unit between the battery unit and the picking station in the autonomous traveling management system moves forward and backward.

3. The autonomous traveling device according to claim 1, wherein
- the detachable structure includes:
  - a locking portion that locks one of a plurality of detachable convex-concave fitting targets to different one detachable convex-concave fitting target, and
  - a position of the locking portion is opposite to a forward-backward movement position of the guide rail with respect to at least one of the plurality of detachable convex-concave fitting targets.

4. The autonomous traveling device according to claim 1, wherein
- in the detachable structure, detachable convex-concave fitting is formed by a convex portion extending in a forward-backward direction of the guide rail and a concave portion extending in the forward-backward direction.

5. The autonomous traveling device according to claim 4, wherein
- the detachable structure includes:
  - the convex portion and the concave portion extending along a front-rear direction of the traveling unit; and
  - a positioning portion that positions one of a plurality of detachable convex-concave fitting targets with respect to different one of the plurality of detachable convex-concave fitting targets in the front-rear direction of the traveling unit.

6. The autonomous traveling device according to claim 1, wherein
- the power supply structure includes:
  - an electrode portion provided on each of the battery unit and the traveling unit at a position sandwiching the fitting gap, for contactlessly supplying power from the battery unit to the traveling unit.

7. An autonomous traveling management system for managing charging at a charging station for an autonomous traveling device that autonomously travels in a charged state after being charged at a charging station of an autonomous traveling management system,
- the autonomous traveling device comprising:
  - a traveling unit that receives power for autonomous traveling;
  - a battery unit capable of supplying the power to the traveling unit in the charged state and in a coupled state where the battery unit is coupled to the traveling unit;
  - a detachable structure that
    - is a structure for detachably connecting the battery unit to the traveling unit by convex-concave fitting,
    - forms, at a coupling area, a fitting gap through which a guide rail that guides the battery unit between the traveling unit and the charging station in the autonomous traveling management system moves forward and backward; and
  - a power supply structure for contactlessly supplying the power from the battery unit to the traveling unit through the fitting gap,
- the system comprising a processor configured to:
  - in a reception phase of receiving the battery unit from the traveling unit, manage forward-backward movement of the guide rail with respect to the fitting gap;
  - in a charging phase of charging the battery unit received from the traveling unit, manage the charging; and
  - in a delivery phase of delivering the charged battery unit to the traveling unit, manage the forward-backward movement of the guide rail with respect to the fitting gap.

8. The autonomous traveling management system according to claim 7, wherein
- managing the forward-backward movement of the guide rail includes managing the forward-backward movement of each separate guide rail into the common fitting gap in the reception phase and the delivery phase.

9. The autonomous traveling management system according to claim 7, wherein
- the processor is further configured to, in order of the reception phase and the delivery phase, assign a traveling position in each phase to a traveling route.

10. An autonomous traveling management system for managing: storing a package at a picking station; and charging at a charging station for an autonomous traveling device that autonomously travels in a charged state after being charged at a charging station of the autonomous traveling management system, the autonomous traveling device comprising:

a traveling unit that receives power for autonomous traveling;

a battery unit capable of supplying the power to the traveling unit in the charged state and in a coupled state where the battery unit is coupled to the traveling unit;

a detachable structure that is a structure for detachably connecting the battery unit to the traveling unit by convex-concave fitting, forms, at a coupling area, a fitting gap through which a guide rail that guides the battery unit between the traveling unit and the charging station in the autonomous traveling management system moves forward and backward; and a power supply structure for contactlessly supplying the power from the battery unit to the traveling unit through the fitting gap, wherein the autonomous traveling device further includes a storage transport unit that transports a package in a storage state where the package is stored at a picking station of the autonomous traveling management system and in a coupled state where the package is coupled onto the battery unit, and the detachable structure includes:

a first coupling portion that is a coupling portion that detachably couples the battery unit to the traveling unit by the convex-concave fitting, and forms, at the coupling area, a first fitting gap that is the fitting gap through which a first guide rail as the guide rail moves forward and backward; and a second coupling portion that is a coupling portion that detachably couples the storage transport unit to the battery unit coupled to the traveling unit by the convex-concave fitting, and forms, at the coupling area, a second fitting gap that is the fitting gap through which a second guide rail that guides the storage transport unit between the battery unit and the picking station in the autonomous traveling management system moves forward and backward, the system comprising a processor configured to:

in a first reception phase of receiving the battery unit from the traveling unit, manage forward-backward movement of the first guide rail with respect to the first fitting gap;

in a charging phase of charging the battery unit received from the traveling unit, manage the charging;

in a first delivery phase of delivering the charged battery unit to the traveling unit, manage the forward-backward movement of the first guide rail with respect to the first fitting gap;

in a second reception phase of receiving the storage transport unit from the battery unit on the traveling unit, manage the forward-backward movement of the second guide rail with respect to the second fitting gap;

in a storage phase of storing the package in the storage transport unit received from the traveling unit, manage storage; and in a second delivery phase of delivering the storage transport unit in which the package is stored to the battery unit on the traveling unit, manage the forward-backward movement of the second guide rail with respect to the fitting gap.

11. The autonomous traveling management system according to claim 10, wherein managing the forward-backward movement of the first guide rail includes managing the forward-backward movement of each separate first guide rail into the common first fitting gap in the first reception phase and the first delivery phase, and managing the forward-backward movement of the second guide rail includes managing the forward-backward movement of each separate second guide rail into the common second fitting gap in the second reception phase and the second delivery phase.

12. The autonomous traveling management system according to claim 10, wherein in order of the second reception phase, the first reception phase, and the first delivery phase, the processor is further configured to assign a traveling position in each phase to a traveling route.

13. An autonomous traveling management method executed by a processor for managing charging at a charging station for an autonomous traveling device that autonomously travels in a charged state after being charged at a charging station of an autonomous traveling management system, the autonomous traveling device comprising:

a traveling unit that receives power for autonomous traveling;

a battery unit capable of supplying the power to the traveling unit in the charged state and in a coupled state where the battery unit is coupled to the traveling unit;

a detachable structure that is a structure for detachably connecting the battery unit to the traveling unit by convex-concave fitting, forms, at a coupling area, a fitting gap through which a guide rail that guides the battery unit between the traveling unit and the charging station in the autonomous traveling management system moves forward and backward; and a power supply structure for contactlessly supplying the power from the battery unit to the traveling unit through the fitting gap, the method comprising:

in a reception phase of receiving the battery unit from the traveling unit, managing forward-backward movement of the guide rail relative to the fitting gap;

in a charging phase of charging the battery unit received from the traveling unit, managing the charging; and in a delivery phase of delivering the charged battery unit to the traveling unit, managing the forward-backward movement of the guide rail relative to the fitting gap.

14. An autonomous traveling management method executed by a processor for managing: storing a package at a picking station and charging at a charging station for an autonomous traveling device that autonomously travels in a charged state after being charged at a charging station of an autonomous traveling management system, the autonomous traveling device comprising:

a traveling unit that receives power for autonomous traveling;

a battery unit capable of supplying the power to the traveling unit in the charged state and in a coupled state where the battery unit is coupled to the traveling unit;

a detachable structure that is a structure for detachably connecting the battery unit to the traveling unit by convex-concave fitting, forms, at a coupling area, a fitting gap through which a guide rail that guides the battery unit between the traveling unit and the charging station in the autonomous traveling management system moves forward and backward; and a power supply structure for contactlessly supplying the power from the battery unit to the traveling unit through the fitting gap, wherein the autonomous traveling device includes a storage transport unit that transports a package in a storage state where the package is stored at a picking station of the autonomous traveling management system and in a coupled state where the package is coupled onto the battery unit, and the detachable structure includes:

a first coupling portion that is a coupling portion that detachably couples the battery unit to the traveling unit by the convex-concave fitting, and forms, at the coupling area, a first fitting gap that is the fitting gap through which a first guide rail as the guide rail moves forward and backward; and a second coupling portion that is a coupling portion that detachably couples the storage transport unit to the battery unit coupled to the traveling unit by the convex-concave fitting, and forms, at the coupling area, a second fitting gap that is the fitting gap through which a second guide rail that guides the storage transport unit between the battery unit and the picking station in the autonomous traveling management system moves forward and backward, the method comprising:

in a first reception phase of receiving the battery unit from the traveling unit, managing forward-backward movement of the first guide rail with respect to the first fitting gap;

in a charging phase of charging the battery unit received from the traveling unit, managing the charging;

in a first delivery phase of delivering the charged battery unit to the traveling unit, managing the forward-backward movement of the first guide rail with respect to the first fitting gap;

in a second reception phase of receiving the storage transport unit from the battery unit on the traveling unit, managing the forward-backward movement of the second guide rail with respect to the second fitting gap;

in a storage phase of storing the package in the storage transport unit received from the traveling unit, managing storage; and in a second delivery phase of delivering the storage transport unit in which the package is stored to the battery unit on the traveling unit, managing the forward-backward movement of the second guide rail with respect to the fitting gap.

* * * * *